US012571450B2

(12) United States Patent　　(10) Patent No.: US 12,571,450 B2
Laird　　(45) Date of Patent: *Mar. 10, 2026

(54) DAMPING ADJUSTER

(71) Applicant: Fox Factory, Inc., Duluth, GA (US)

(72) Inventor: Andrew Laird, Seattle, WA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,912

(22) Filed: Oct. 19, 2023

(65) Prior Publication Data

US 2024/0044391 A1　　Feb. 8, 2024

Related U.S. Application Data

(63) Continuation of application No. 17/382,257, filed on Jul. 21, 2021, now Pat. No. 11,796,027.

(60) Provisional application No. 63/054,640, filed on Jul. 21, 2020.

(51) Int. Cl.
　*F16F 9/44*　　(2006.01)
　*F16F 9/34*　　(2006.01)
　*F16K 1/14*　　(2006.01)
　*F16K 1/52*　　(2006.01)

(52) U.S. Cl.
　CPC .................. *F16F 9/44* (2013.01); *F16F 9/34* (2013.01); *F16K 1/14* (2013.01); *F16K 1/523* (2013.01); *F16F 2228/066* (2013.01)

(58) Field of Classification Search
　CPC ...... F16F 9/34; F16F 9/44; F16F 9/466; F16F 2230/0047; F16F 2230/0041; F16F 2228/066; F16K 1/14; F16K 1/523; B62K 25/286; B62K 2025/048
　USPC ........................................................ 251/209
　See application file for complete search history.

(56) References Cited

U.S. PATENT DOCUMENTS

| | | | |
|---|---|---|---|
| 2,438,672 A | | 3/1948 | Wilton |
| 2,493,966 A | | 1/1950 | Hartley |
| 2,510,514 A | | 6/1950 | Mueller |
| 2,723,102 A | | 11/1955 | Mueller |
| 3,910,308 A | | 10/1975 | Mack |
| 3,949,966 A | | 4/1976 | Fabish |
| 4,850,567 A | | 7/1989 | Ambrosi |
| 5,146,948 A | * | 9/1992 | Runkel .................... F16F 9/34 188/282.5 |
| 6,065,573 A | * | 5/2000 | Kelly ........................ F16F 9/44 188/319.1 |
| 7,374,028 B2 | | 5/2008 | Fox |
| 7,559,339 B2 | | 7/2009 | Golan et al. |
| 8,336,683 B2 | * | 12/2012 | McAndrews ........... F16F 9/185 188/314 |
| 8,353,498 B2 | | 1/2013 | Fukano et al. |
| 8,838,335 B2 | | 9/2014 | Bass et al. |

(Continued)

*Primary Examiner* — Craig M Schneider
*Assistant Examiner* — Andrew J Rost

(57)　　　ABSTRACT

A damping adjuster is disclosed herein. The damping adjuster includes an adjuster housing and an adjuster shaft. The adjuster shaft rotatable within the adjuster housing, the adjuster shaft comprising a variable flow area feature, the variable flow area feature formed annularly about a portion of the adjuster shaft, the variable flow area feature comprising a plurality of different flow area values therealong. The damping adjuster also includes a fluid flow path through the adjuster housing, wherein the fluid flow path includes the variable flow area feature of the adjuster shaft.

14 Claims, 18 Drawing Sheets

(56)  References Cited

U.S. PATENT DOCUMENTS

| | | | |
|---|---|---|---|
| 9,567,029 | B2 | 2/2017 | Fox |
| 11,796,027 | B2 * | 10/2023 | Laird ........................ F16F 9/44 |
| 2008/0116622 | A1 | 5/2008 | Fox |
| 2016/0069415 | A1 | 3/2016 | Murphy |
| 2018/0216692 | A1 | 8/2018 | Coaplen et al. |
| 2020/0324849 | A1 * | 10/2020 | Pye ........................ B62K 25/08 |

* cited by examiner

A-A
220

305

320

325

380

DAMPING ADJUSTER

CROSS-REFERENCE TO RELATED APPLICATIONS

This application is a Continuation of and claims priority to and benefit of co-pending U.S. patent application Ser. No. 17/382,257 filed on Jul. 21, 2021, entitled "DAMPING ADJUSTER" by Andrew Laird, and assigned to the assignee of the present application, the disclosure of which is hereby incorporated by reference in its entirety.

The application Ser. No. 17/382,257 claims priority to and benefit of U.S. Provisional Patent Application No. 63/054, 640 filed on Jul. 21, 2020, entitled "LOW SPEED DAMP-ING ADJUSTER" by Andrew Laird, and assigned to the assignee of the present application, the disclosure of which is hereby incorporated by reference in its entirety.

FIELD OF THE INVENTION

Embodiments of the invention generally relate to methods and apparatus for use in a vehicle suspension damper.

BACKGROUND OF THE INVENTION

Vehicle suspension systems typically include a damping component or components that help provide a comfortable ride, enhance performance of a vehicle, and the like. Presently, in a damper, the adjuster consists of the translation of a nominally conical or variably tapered part into a hole.

Figure 1A:
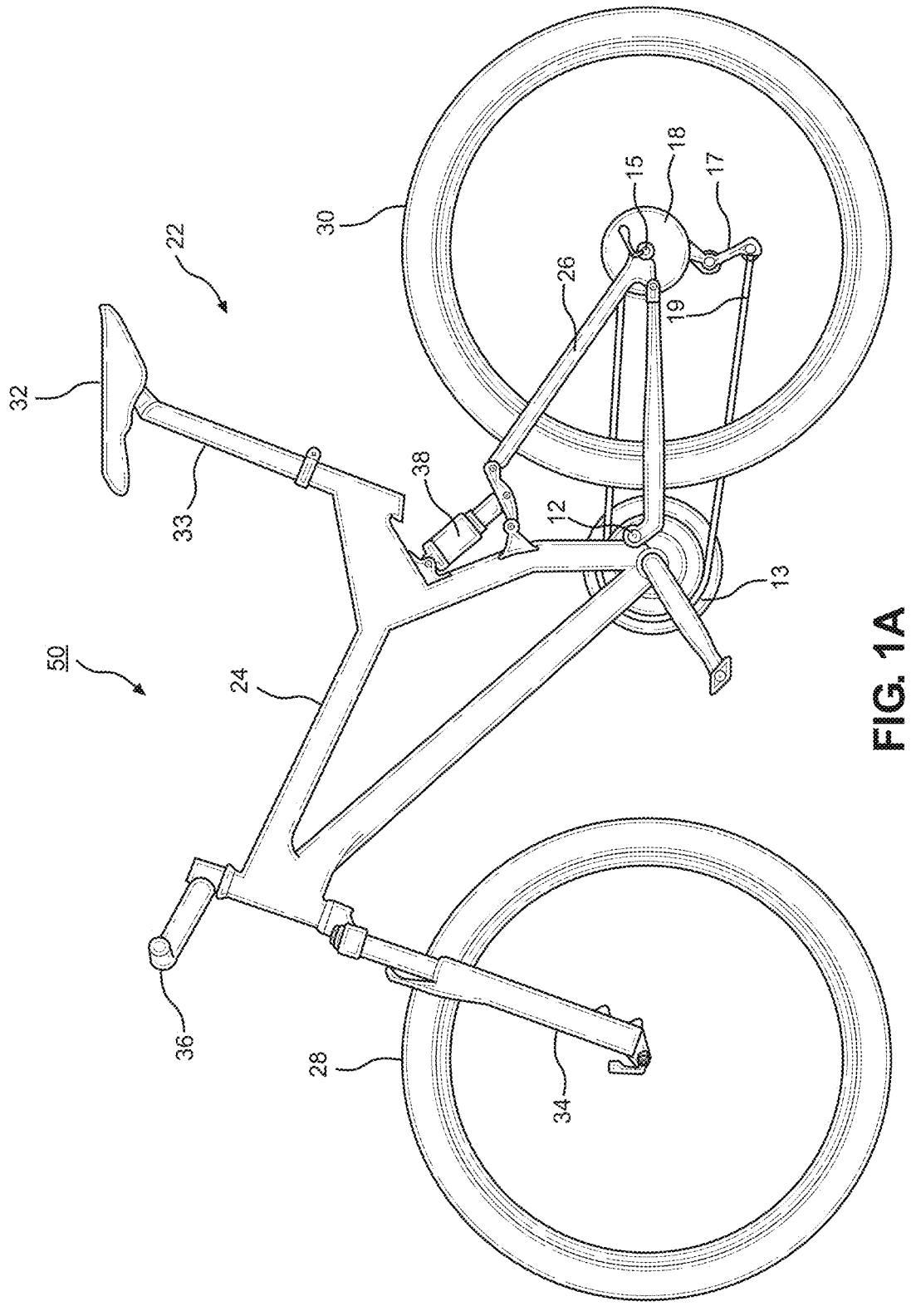
FIG. 1A is a schematic side view of a bicycle with damper having an annularly varying damping adjuster, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In general, a suspension system for a vehicle provides a motion modifiable connection between a portion of the vehicle that is in contact with a surface and some or all of the rest of the vehicle that is not in contact with the surface. For example, the portion of the vehicle that is in contact with the surface can include one or more wheel(s), skis, tracks, hulls, etc., while some or all of the rest of the vehicle that is not in contact with the surface can include anything on a frame, a seat, handlebars, engines, cranks, etc.

The initial sag settings or "sag", sometimes also written as "SAG" defines a pre-defined vehicle ride height and suspension geometry based on the initial compression of one or more shock assemblies of the suspension system for a given vehicle when it is within its normal load envelope configuration (e.g., with a rider/driver and any initial load weight). Once the sag is established for a vehicle, it will be the designated ride height of the vehicle, until and unless the sag is changed.

In a basic setup, the suspension will increase ride comfort, endurance, and longevity by reducing or even removing the force of jarring events, rattles, vibrations, jostles, and the like which are encountered by the portion of the vehicle that is in contact with the surface and the suspended portions of the vehicle to include components such as seats, steering wheels/handlebars, pedals/foot pegs, fasteners, drive trains, engines, and the like.

For example, using a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame). The suspension can be used to reduce the force of impacts encountered by the wheel as they are transferred to the suspended portions.

In a snow machine, it is a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

As vehicle utilization scenarios change, one or more shock assemblies of the suspension system can be adjusted for different characteristics based on the use type of the vehicle, terrain, purpose (e.g., rock crawl, normal use, race set-up, etc.), and the like. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its sag setting as quickly as possible in preparation for the next encounter. In contrast, a street bike racer (track racing vehicle, boat/PWC racer, etc.) would want a firmer suspension configuration with a very small range of motion to provide feel for the grip of the tire, maintaining aerodynamic geometries, and the like, in order to obtain the maximum performance from the vehicle. In a normal use scenario, such as a trip to the local store, regular ride around town, drive to grandma's house, a boat ride out on a lake, etc., one choice for the suspension configuration would be based on providing the most comfort to the people.

In one embodiment, there may be times where changes to a suspension component are desired during a given ride/drive. For example, a bike rider in a sprinting scenario would often want to lockout the suspension component to remove the opportunity for rider induced pedal bob. Similarly, a ride/drive from a paved road to an off-road environment (or vice-versa) would also be a time when a change to one or more suspension component settings is valuable.

In general, pedal bob is a suspension motion caused when the rider is standing up and pedaling. As the rider reaches the bottom of the crank/pedaling circle, a dead spot is created in the pedal circle as the rider's weight momentarily comes to reset on the pedal that is at the bottom of the pedal circle and before the opposite leg can begins to pick up the rider weight on the opposite downward pedal stroke. Pedal bob wastes energy that is input into the bicycle as the suspension will absorb a portion of the energy in the form of suspension friction instead of using all of the input energy for propulsion.

Additional information regarding suspension settings, sag and sag setup can be found in U.S. Pat. No. 8,838,335 which is incorporated by reference herein, in its entirety.

With respect to the term lockout, for purposes of the following discussion, lockout refers to the most restricted flow state attainable or desirable. Thus, in one embodiment, lockout refers to a stoppage of all fluid flow through a given fluid path. However, in another embodiment, lockout does not stop all the fluid flow through a given fluid path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the damper has been reduced to a minimum size for a given damper, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

In one embodiment, the damping adjuster could be a low speed compression damping adjuster. In another embodiment, the damping adjuster could be a low speed rebound damping adjuster. In one embodiment, the damping adjuster could be a high speed compression damping adjuster. In another embodiment, the damping adjuster could be a high speed rebound damping adjuster. In one embodiment, the damping adjuster can be used at speeds not typically considered either a low speed or a high speed.

For purposes of brevity and clarity the following discussion will refer to the use of the present invention in a compression circuit. However, it will be understood that embodiments of the present invention may be used in other circuits including, but not limited to, a rebound circuit.

Further, in one embodiment, the full range of rotation is significantly reduced (from a number of revolutions associated with present damping adjusters) to a range of rotation that is less than a single revolution. As such, the end user, a bike shop, a service center, or the like can visually and immediately determine the present damping setting.

In one embodiment, by utilizing the newly invented method and system to adjust the high and/or low speed compression and/or rebound of the suspension damper, a number of additional benefits are realized. One benefit is realized by manufactures. Instead of needing to manufacture a number of different components and assemble a damping adjuster, the manufacture can build the adjuster shaft as a single component. In one embodiment, the adjuster shaft is machined, cast, 3D printed, or the like. By making the damping adjuster shaft with lockout capabilities from a single component, manufacturers will save time and money.

Moreover, the single adjuster shaft component will be less prone to failure or fouling than the assembly of components it is replacing. Thus, for the consumer, reliability of the damper will be improved while maintenance, repair, and replacement costs will be reduced (if not completely erased).

In one embodiment, the annularly varying damping adjuster can use a single range of rotation to control damping characteristics and lockout. In one embodiment, the annularly varying damping adjuster can use a single range of rotation that is less than 360 degrees to control the damping characteristics and also use a single translation of the annularly varying damping adjuster up or down with respect to its radial axis to provide lockout.

In one embodiment, the annularly varying damping adjuster can use a single range of rotation that is less than 360 degrees to control damping characteristics and lockout. In one embodiment, by having the range of rotation less than 360 degrees, a manufacturer (seller, dealer, mechanic, user, or the like) can provide one or more identifiers on the housing and/or knob that identify different damping settings. In general, the one or more identifiers on knob and housing will allow a user (a mechanic, or the like) to discern the present damping adjustment setting and further allow the user (mechanic, or the like) to knowingly and quickly adjust the damping setting to a different damping setting and even lock it out completely (or to a smallest available flow area).

Once again, although the following discussion is provided with compression examples, these are provided for purposes of clarity and a lack of repetition. However, it should be appreciated that while one embodiment is directed toward compression, another embodiment, can utilize the same systems and features disclosed herein as they apply to rebound. Moreover, it should be appreciated that one embodiment is directed toward high speed damping (in compression and/or rebound), and another embodiment is directed toward low speed damping (in compression and/or rebound).

Referring now to FIG. 1A, a schematic side view of a bicycle 50 is shown in accordance with an embodiment. In one embodiment, damping adjuster 220 is shown in further detail in the partial view of damper assembly 38 provided in FIG. 1B. Although a bicycle 50 is used in the discussion; in one embodiment, the damping adjuster 220 could be used in a damper on another vehicle such as, but not limited to a bicycle, motorcycle, ATV, jet ski, car, snow mobile, side-by-side, and the like.

Bicycle 50 includes a front wheel 28 which is coupled to the main frame 24 via front fork 34 and a rear wheel 30 which is coupled to the main frame 24 via swing arm 26. A seat 32 is connected to the main frame 24 via seatpost 33 in order to support a rider of the bicycle The front wheel 28 is supported by a front fork 34 which, in turn, is secured to the main frame 24 by a handlebar assembly 36. The rear wheel 30 is connected to the swing arm 26 of the main frame 24 at rear wheel axis 15. A damper assembly 38 is positioned between the swing arm 26 and the main frame 24 to provide resistance to the pivoting motion of the swing arm 26 about pivot point 12. Thus, the illustrated bicycle 50 includes a suspension member between swing arm 26 and the main frame 24 which operate to substantially reduce rear wheel 30 impact forces from being transmitted to the rider of the bicycle 50.

In one embodiment, front fork 34 also provide a suspension function via a damping assembly in at least one fork leg; as such, in one embodiment, the bicycle 50 is a full suspension bicycle.

Although a full suspension bicycle 50 is shown, in one embodiment, bicycle 50 could have a rigid frame 22 (e.g., main frame 24 fixedly coupled to swing arm 26) and/or rigid front fork 34 and thus be a semi-rigid or fully rigid bicycle 50. However, even the fully rigid bicycle 50 could have a dropper or other type of seatpost shock. Thus, the damping adjuster 220 described herein, can be incorporated in one or more different aspects such as, but not limited to, the rear shock, one or more of the front fork shocks, the seatpost 33 shock, a portion of the handlebar assembly, or the like.

In one embodiment, bicycle 50 is driven by a chain 19 that is coupled with both front sprocket 13 and rear sprocket 18. As the rider pedals, the generated force causes front sprocket 13 to be rotated about its axis. This rotational energy from front sprocket 13 applies a force to chain 19 which transfers the energy to rear sprocket 18 where it is ultimately applied to rear wheel 30. However, in one embodiment, the rider force provided to the pedal can also deleteriously interact with the suspension. For example, while riding up a hill, some of the rider applied force can be absorbed by the suspension, this is sometimes referred to as pedal bob. In general, firming-up (or stiffening) the suspension will reduce or remove this energy loss. Although a chain 19 is shown in one embodiment, in another embodiment, a final drive system such as a belt, or the like could be used.

Although described herein with respect to a bicycle 50, in one embodiment, the damping adjuster 220 could be used in a damper assembly 38 on a number of different vehicles (and in one or more different locations on the number of different vehicles) such as but not limited to, a motorized bicycle, motorcycle, ATV, jet ski, car, snow mobile, side-by-side, and the like. Further, a motorized bike can include a bike with a combustion motor, an electric bike (e-bike), a hybrid electric and combustion bike, a hybrid motor and pedal driving bike, and the like.

Figure 1B:
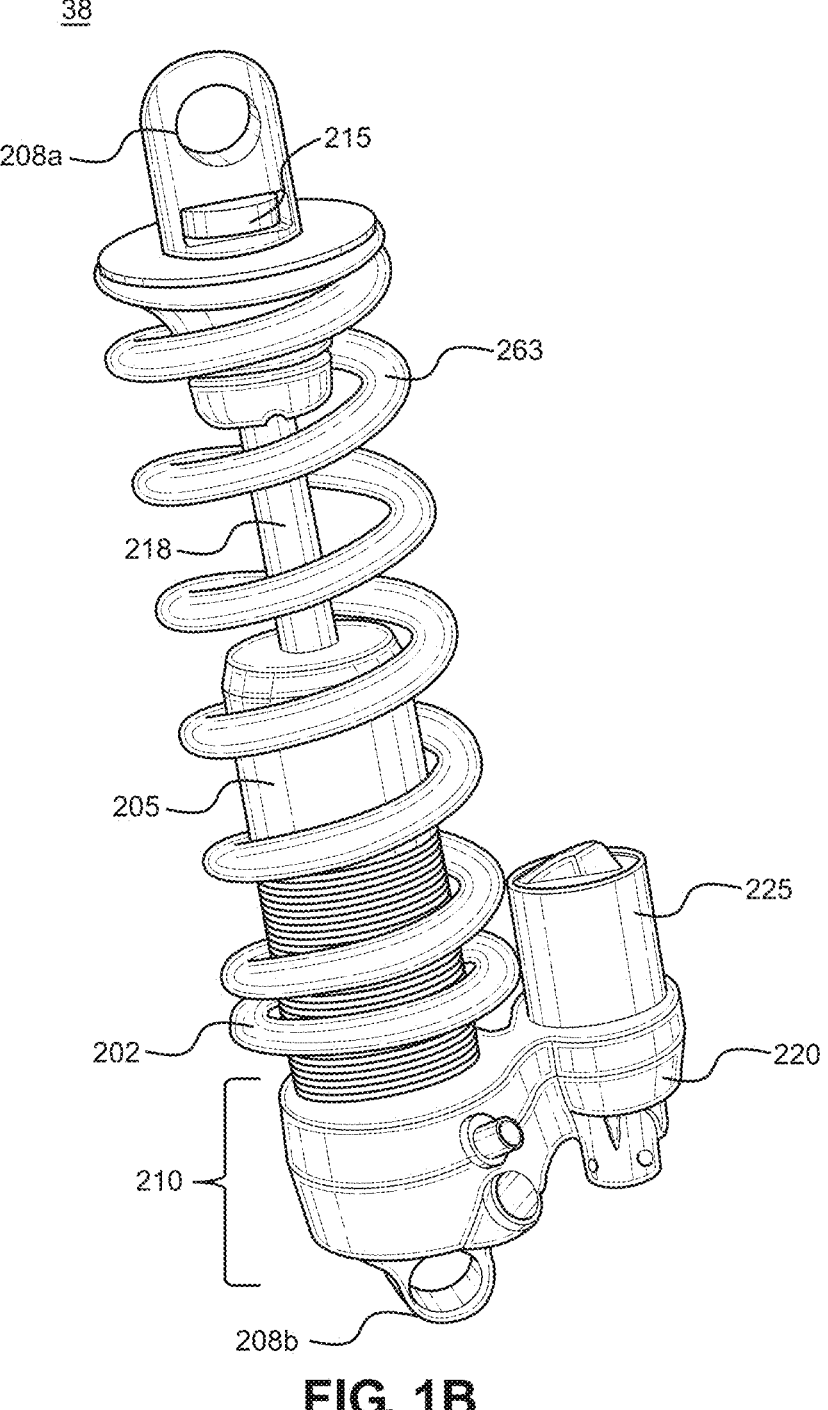
FIG. 1B is a perspective view of a damper having an annularly varying damping adjuster, in accordance with an embodiment.

Referring now to FIG. 1B, a perspective view of a damper assembly 38 having damping adjuster 220 is shown in accordance with an embodiment. In one embodiment, damper assembly 38 includes eyelets 208a and 208b, damper housing 205, preload adjustment collar 202, helical spring 263, rebound adjuster 215, shaft 218, end cap 210 with damping adjuster 220, and reservoir 225. In one embodiment, reservoir 225 is a remote reservoir. In one embodiment, reservoir 225 is a piggyback reservoir as described in U.S. Pat. No. 7,374,028 the content of which is entirely incorporated herein by reference.

Although a coil sprung fluid damper assembly is shown in FIG. 1B, in one embodiment, the damping adjuster 220 could be used in a number of different suspension damper types such as an air sprung fluid damper assembly, a stand-alone fluid damper assembly, and the like.

Figure 2A:
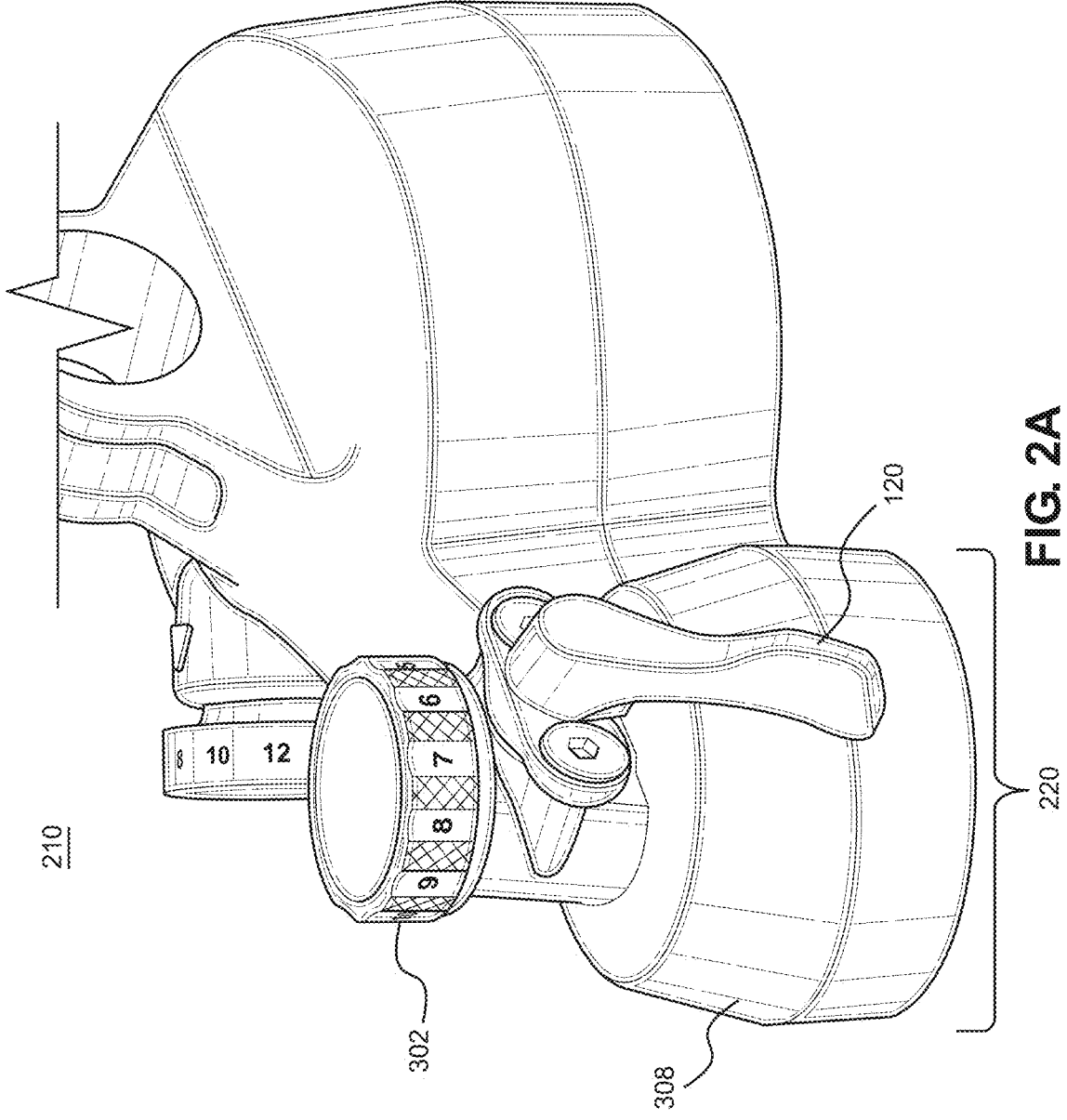
FIG. 2A is a perspective view of the end cap with an annularly varying damping adjuster, in accordance with an embodiment.

With reference now to FIG. 2A, a perspective view of end cap 210 with damping adjuster 220 portion of the damper of FIG. 1B is shown in accordance with an embodiment. In general, the damping adjuster 220 provides a change in a damping orifice size by way of axial rotation of an adjuster shaft 305 (shown at least in FIGS. 2B) within the adjuster housing 308, without the complications of a threaded needle, a threaded opening, a separate cam and cam follower, or the like.

Moreover, unlike a prior damping adjuster that consisted of a number of parts and operated by the translation of a nominally conical or variably tapered part into a hole (either rod or threaded), one embodiment provides a single manufactured annularly varying adjuster shaft 305 that is axially rotated within the adjuster housing 308 to perform the damping adjustment.

In one embodiment, damping adjuster 220 includes adjuster knob 302 and adjuster housing 308. In one embodiment, damping adjuster 220 optionally includes a firm switch 120 to switch the damping adjuster 220 to its firmest (e.g., lockout) setting. In one embodiment, there is no firm switch 120 and instead, adjuster knob 302 is rotated to its firmest (e.g., lockout) setting. In one embodiment, damping adjuster 220 includes both the firm switch 120 and the adjuster knob 302 that can be rotated to its firmest (e.g., lockout) setting.

Figure 2B:
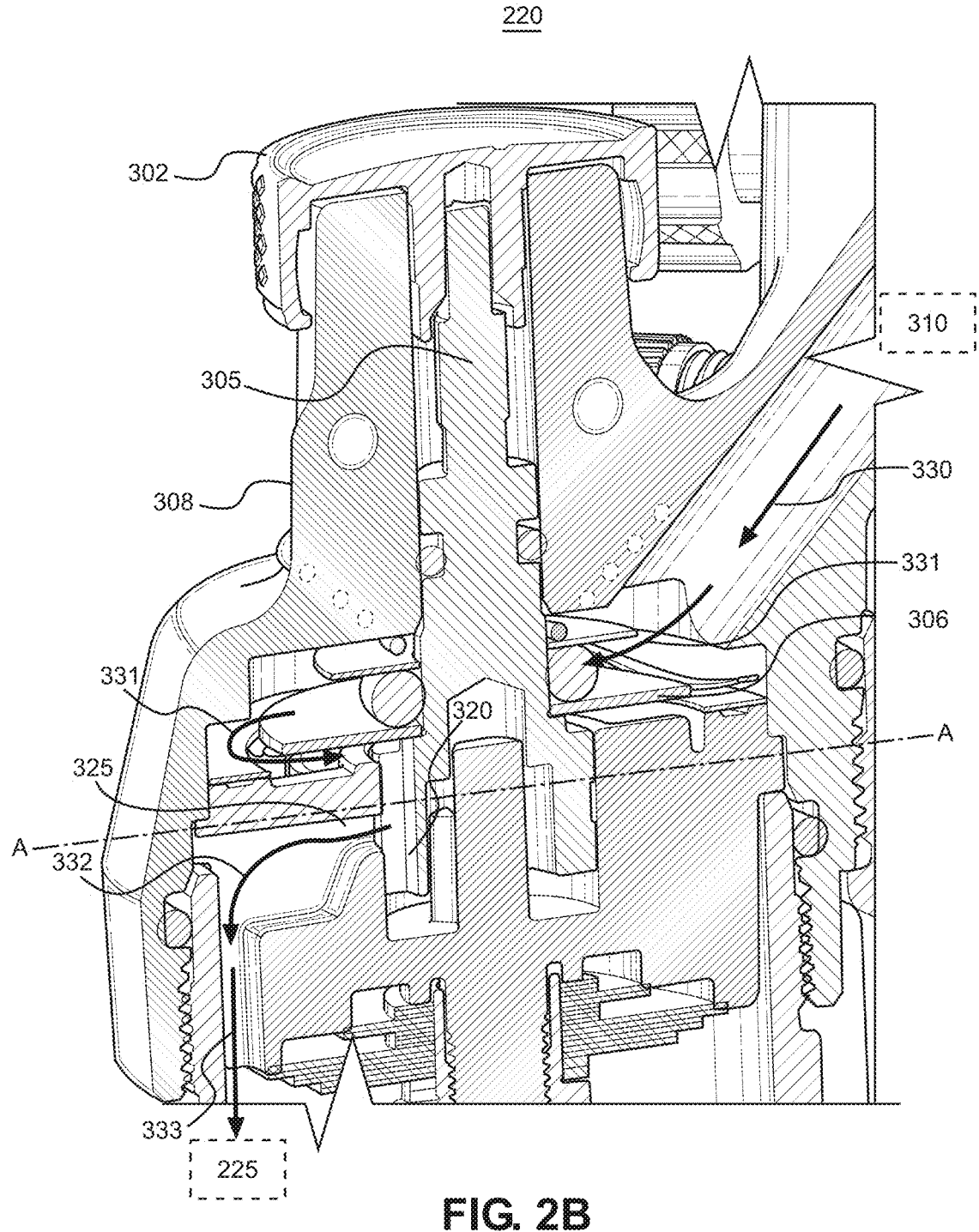
FIG. 2B is a side-section view of the annularly varying damping adjuster, in accordance with an embodiment.

Referring now to FIG. 2B, a section view of the damping adjuster 220 having an adjuster shaft 305 incorporated therewith is shown in accordance with an embodiment. In one embodiment, damping adjuster 220 also includes adjuster knob 302, plate 306, adjuster housing 308, damper shaft 310, flow path 330, flow path 331, slot 320, port 325, flow path 332, and flow path 333. In one embodiment, port 325 is approximately horizontal. In one embodiment, port 325 has a graded slope.

In one embodiment, a rotary motion of the adjuster shaft 305 adjusts the size of the flow area as it passes through port 325. In one embodiment, adjuster shaft 305 uses a variable cross-section flow path or annular flow area of varying size (e.g., variable flow area feature 380 shown in FIGS. 3A-3F) to make a damping adjustment.

In one embodiment, the variable flow area feature 380 is an annular flow area of varying size that runs less than 360 degrees about the body of adjuster shaft 305. In other words, the flow area changes as the variable flow area feature 380 wraps annularly about the body of adjuster shaft 305 in a plane orthogonal to the long axis of adjuster shaft 305 (where the long axis is similar to the directional arrow 321 of FIG. 2C). In one embodiment, the variable flow area feature 380 changes in one or more of depth, width, or the like as it wraps annularly about the body of adjuster shaft 305 to provide the varying flow area. In one embodiment, the varying flow area of variable flow area feature 380 changes in a stepped, geometric, channel, or other shape, such as stepped variable flow area feature 381. That is, the variable flow area feature 380 would have a deepest and/or widest depth at the highest flow area setting of adjuster shaft 305 and then begin reducing the flow area size as it wrapped annularly about adjuster shaft 305 until it reached its shallowest and/or narrowest depth at the lowest (or stopped) flow area setting.

In one embodiment, as the adjuster shaft 305 is rotated about its axis from a higher flow area setting toward a lower (or stopped) flow area setting, the available flow area for the variable flow area feature 380 would become shallower and/or narrower thereby reducing the fluid flow rate and increasing the firmness of the damping characteristics. Alternatively, as the adjuster shaft 305 is rotated about its axis from a lower flow area setting toward a higher flow area setting, the available flow area for the variable flow area feature 380 would become deeper and/or wider thereby increasing the fluid flow rate and softening the damping characteristics.

Thus, based on the rotational alignment of adjuster shaft 305 the portion of variable flow area feature 380 between flow path 331 and flow path 332 is also adjusted. In so doing, the flow area through damping adjuster 220 is adjustable by modifying the rotational position of the adjuster shaft 305, and thus the portion of the variable flow area feature 380 aligned with the flow path through the adjuster housing 308.

In one embodiment, as shown and described herein, the variable flow area feature 380 causes a size of the flow area between flow path 331 to flow path 332 in the adjuster housing 308 to change as the adjuster shaft 305 is rotated about an axis within the adjuster housing 308. Although a channel is described, in one embodiment, the variable flow area feature 380 could be another geometry such as a spiral, stepped shape, triangle, s-shape, etc.

In one embodiment, as shown in FIG. 2B, the displaced fluid starts from the damper shaft 310 and travels along flow path 330, e.g., the fluid flowing along flow path 330 is shaft displaced flow. The fluid then flows along flow path 331 around the adjuster shaft 305, under the plate 306, and down into slot 320. When the slot 320 is aligned with a port 325, the fluid flows from slot 320 into the port 325 along flow path 332. The fluid then flows along flow path 333 to the reservoir 225, ultimately causing the floating piston in reservoir 225 to displace. Therefore, FIG. 2B is a configuration of a low restriction flow path provided by damping adjuster 220.

Figure 2C:
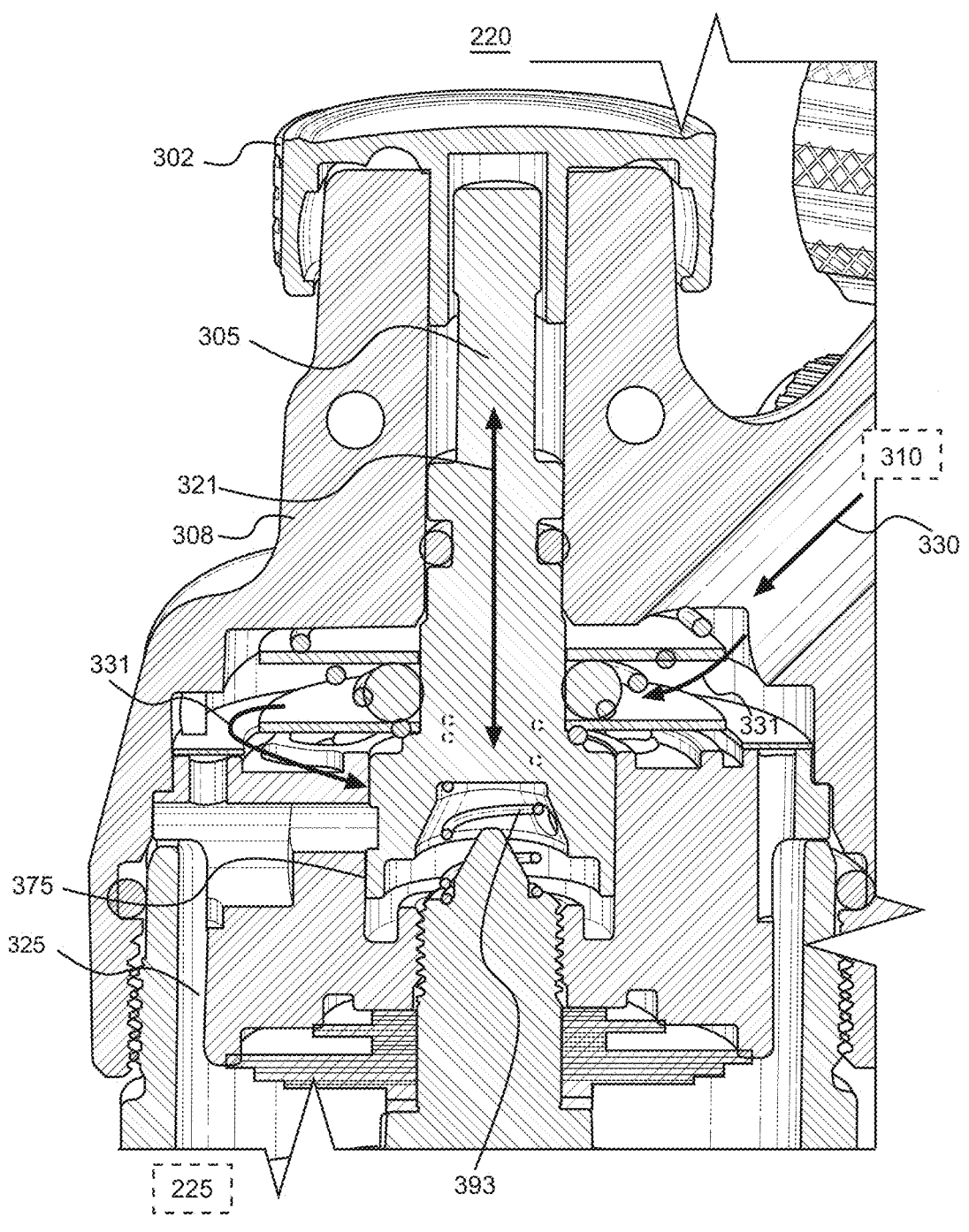
FIG. 2C is a side-section view of the annularly varying damping adjuster in a lowest (or lockout) flow rate position, in accordance with an embodiment.

With reference now to FIG. 2C, a section view of damping adjuster 220 having an adjuster shaft 305 incorporated therewith moved into a lowest flow rate position such that flow is stopped or almost stopped from the damper shaft 310 into the reservoir 225 is shown in accordance with an embodiment. In general, the lowest flow rate position refers to a rotational position of adjuster shaft 305 that causes the least amount of flow from the damper shaft 310 through the adjuster to the reservoir 225.

In one embodiment, as shown in FIG. 2C, a coil spring 393 is located below a portion of adjuster shaft 305 and above a portion of the adjuster housing 308. In one embodiment, the coil spring 393 is used to apply an upward force on adjuster shaft 305 (e.g., a force in the direction of arrow 321 toward adjuster knob 302).

In one embodiment, the adjuster shaft 305 is rotated until the flow path into port 325 is closed or reduced to a minimal flow state as shown by flow limited portion 375. An example of the lowest flow rate location on adjuster shaft 305 is shown as "L" in the variable flow area feature 381 discussion coinciding with FIGS. 3A and 3B.

In another embodiment, a translational motion can be used alone, or in combination with the rotational motion, of adjuster shaft 305 to adjust the flow area. In one embodiment, the translational motion refers to the adjuster shaft 305 being moved up or down along its axis as shown by arrow 321 (which is also in one embodiment, the axis of rotation for adjuster shaft 305) within adjuster housing 308 until the flow path into port 325 is mostly or completely closed as shown by flow limited portion 375.

Figure 2D:
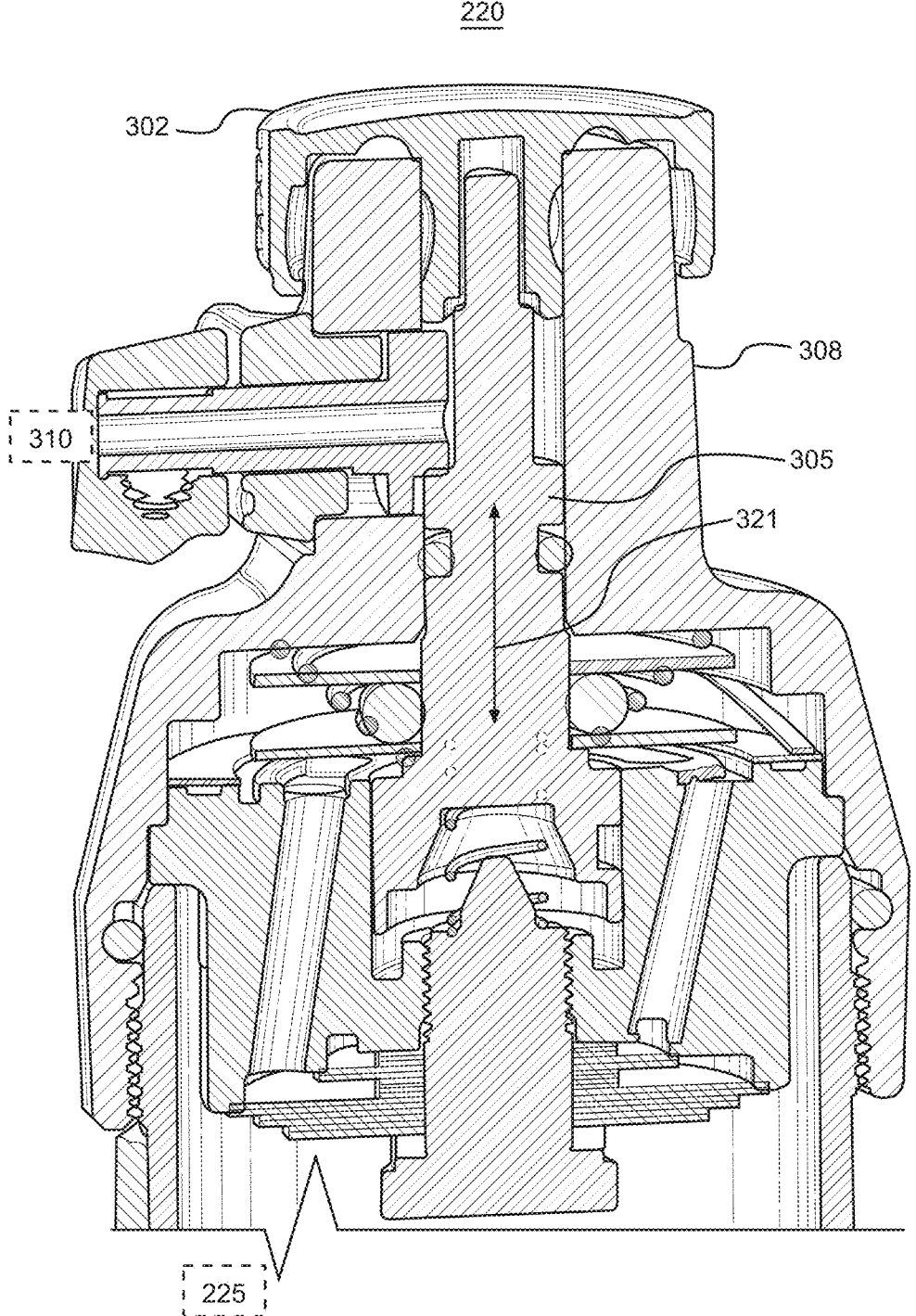
FIG. 2D is a side-section view of the annularly varying damping adjuster in a different orientation with respect to the end cap, in accordance with an embodiment.

With reference now to FIG. 2D, a section view of damping adjuster 220 having an adjuster shaft 305 incorporated within adjuster housing 308 is shown in accordance with an embodiment. FIG. 2D provides an embodiment of one variation of the location and/or orientation of one or more of damper shaft 310, one or more of the low speed adjuster flow paths, reservoir 225, and the like.

Figure 3A:
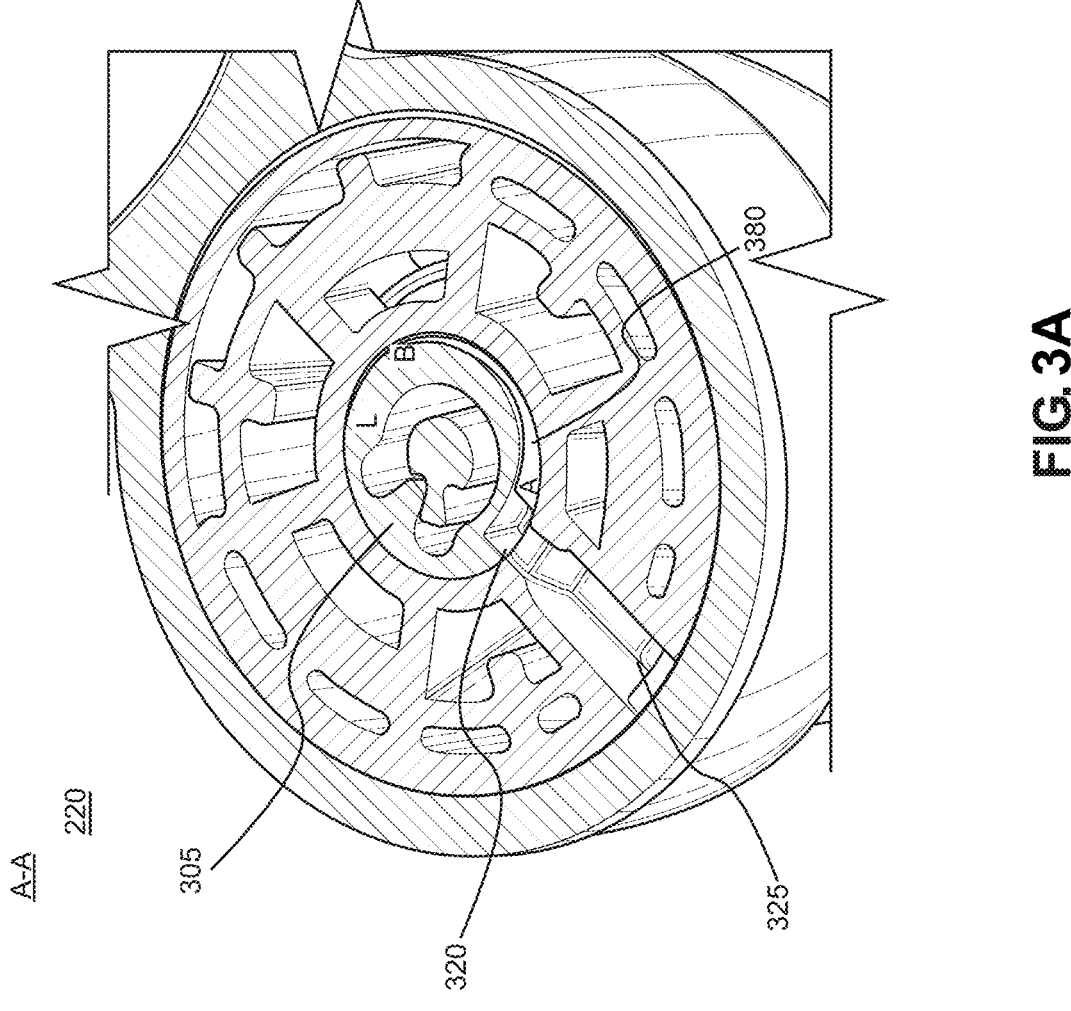
FIG. 3A is a cut-away top perspective view about reference plane A-A of the annularly varying damping adjuster in a compression damping position, in accordance with an embodiment.

Referring now to FIG. 3A and to FIG. 2B, a cut-away view about reference plane A-A of damping adjuster 220 showing the adjuster shaft 305 in the low restriction configuration (of FIG. 2B) where there is low restriction on the flow path. That is, slot 320 is aligned (or oriented) with port 325, such that there is little to no impediment as the flow transitions from flow path 331 into flow path 332 and no need for the fluid to flow along variable flow area feature 380.

Figure 3B:
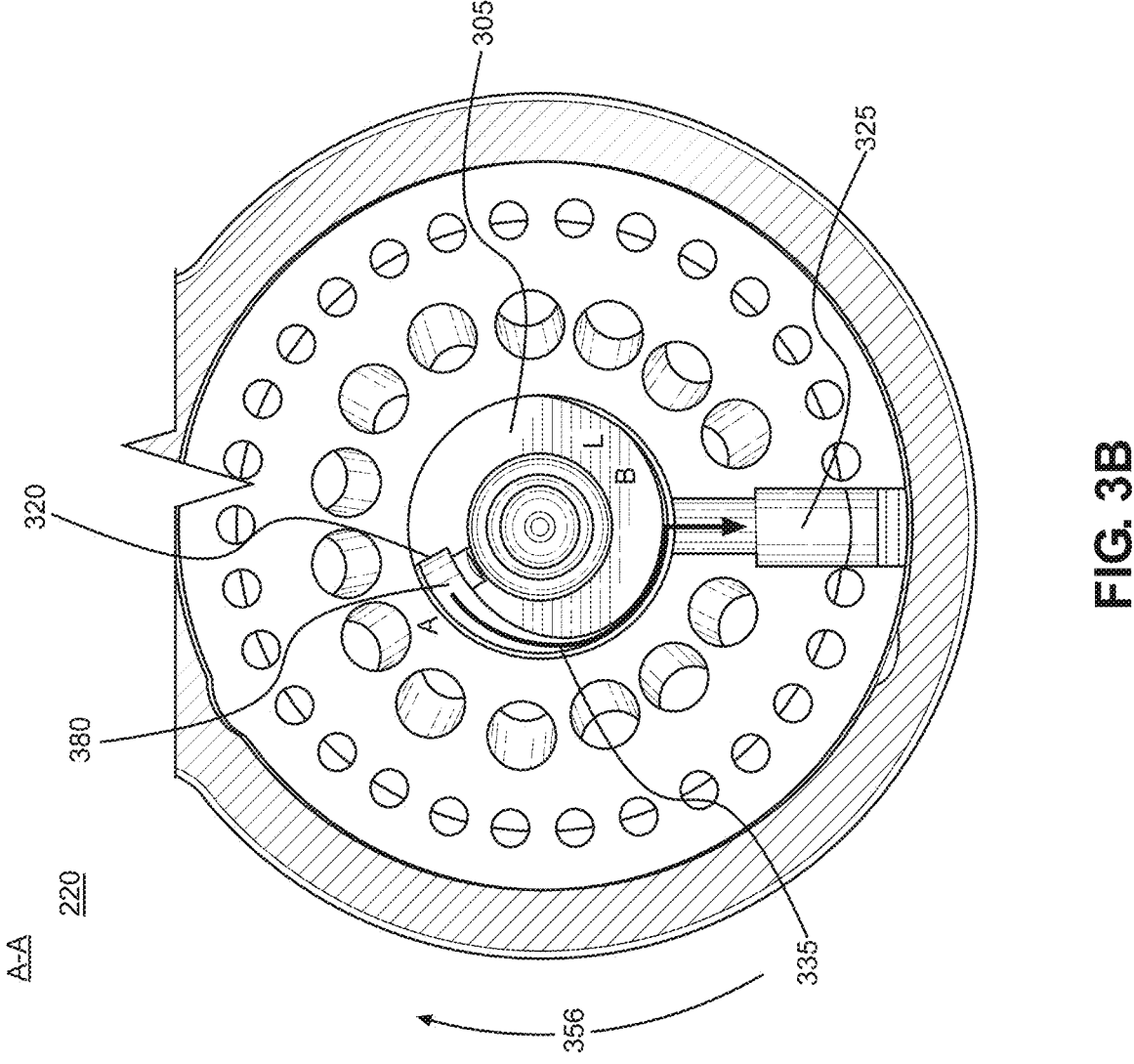
FIG. 3B is a cut-away top view about reference plane A-A of the annularly varying damping adjuster in a different compression damping position, in accordance with an embodiment.

With reference now to FIG. 3B, a cut-away view about reference plane A-A of the damping adjuster 220 showing the adjuster shaft 305 in a medium compression damping position is shown in accordance with an embodiment. FIG. 3B will be discussed in conjunction with FIG. 2B for purposes of clarity.

In one embodiment, as shown in FIGS. 2B and 3B, by turning the adjuster shaft 305 clockwise 356 (in one embodiment by using adjuster knob 302), slot 320 is no longer aligned with port 325. As such, instead of the flow path 331 going directly and unimpeded through slot 320 and into port 325 as shown by flow path 332, an additional metered route is required. That is, an additional flow path 335 (along variable flow area feature 380) is added between flow path 331 and flow path 332.

In one embodiment, additional flow path 335 uses variable flow area feature 380 to make the metered flow transition from flow path 331 to flow path 332, as the distance between adjuster shaft 305 and the walls of adjuster housing 308 (that do not include slot 320) is very narrow (e.g., in one embodiment in the range of thousandths of an inch). As such, the fluid cannot easily flow around adjuster shaft 305 to make its way into port 325 and will therefore flow along variable flow area feature 380 to travel from flow path 331 into port 325. Moreover, in one embodiment there is no contact between adjuster shaft 305 and adjuster housing 308 at that location. Therefore, since the adjuster shaft 305 is not threaded with respect to adjuster housing 308, in one embodiment, adjuster shaft 305 can move freely up and down (e.g., translation) within adjuster housing 308.

In one embodiment, the turning of adjuster knob 302 could provide a single adjustment. E.g., unmetered flow when slot 320 is aligned with port 325 as shown in FIG. 3A, and metered flow when slot 320 is no longer aligned with port 325 and must use the additional flow path 335 along variable flow area feature 380 as shown in FIG. 3B. In one embodiment, the turning of adjuster knob 302 could provide a plurality of variable flow area adjustments.

Figure 3D:
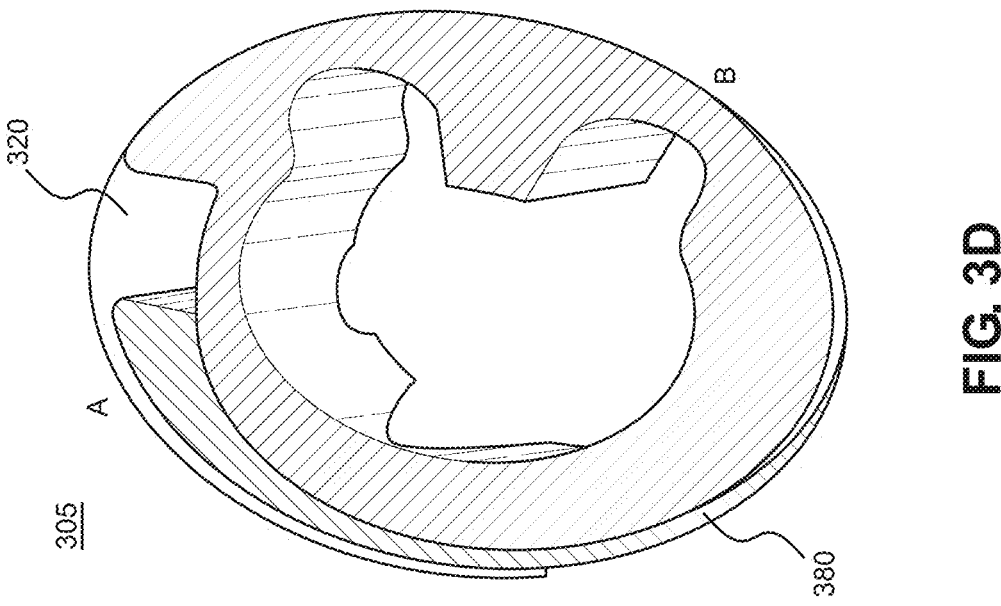
FIG. 3D is a cross-sectional view about reference plane A-A of the annularly varying damping adjuster with a gradual reducing width of the variable flow area feature, in accordance with an embodiment.
Figure 3C:
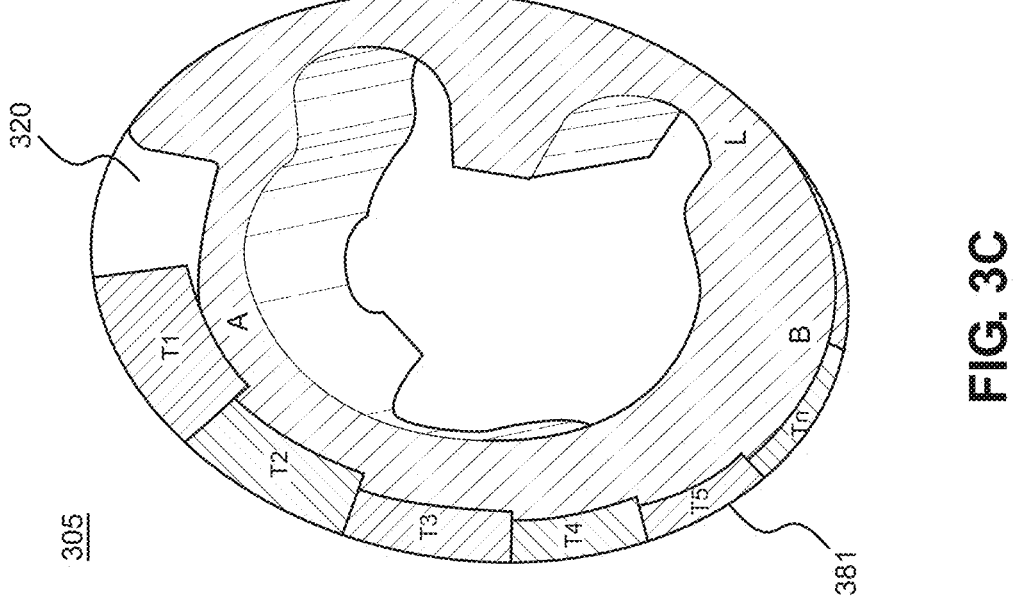
FIG. 3C is a cross-sectional view about reference plane A-A of the annularly varying damping adjuster with a number of graduated steps in the variable flow area feature, in accordance with an embodiment.

For example, referring now to FIG. 3C, a sectional view of the adjuster shaft 305 having a number of graduated steps (e.g., steps t1-tn) in the stepped variable flow area feature 381 is shown in accordance with an embodiment. That is, in one embodiment, stepped variable flow area feature 381 could have a number of different width steps t1-tn to provide a predefined number of established damping adjustments. For example, if stepped variable flow area feature 381 consisted of six different width steps that got progressively narrower from point A to point B on stepped variable flow area feature 381, then the user would be able to turn adjuster knob 302 (and thus adjuster shaft 305) to seven different settings. E.g., fully open with slot 320 aligned with port 325, partially impeded at the first step width t1, further impeded at a second step width t2, further impeded at a third step width t3, further impeded at a third step width t4, further impeded at a third step width t5, and then mostly impeded at the sixth and final different step width to (e.g., fully metered as shown in FIG. 3B). Although six steps are described, in one embodiment the actual number of steps on stepped variable flow area feature 381 could be more or fewer.

With reference now to FIG. 3D, a sectional view of adjuster shaft 305 has a variable flow area feature 380 with a gradual reducing width is shown in accordance with an embodiment. In one embodiment, the width of variable flow area feature 380 changes annularly along adjuster shaft 305 such that the user would be able to turn adjuster knob 302 (and thus adjuster shaft 305) to obtain an "infinite" range damping adjustment. For example, if the width of variable flow area feature 380 annularly narrows such that it is widest at point A and narrowest at point B, then any turning of adjuster knob 302 would result in a change in the damping. Although variable flow area feature 380 is shown at a given length in one embodiment, in one embodiment, the length of variable flow area feature 380 could be longer or shorter.

Figure 3F:
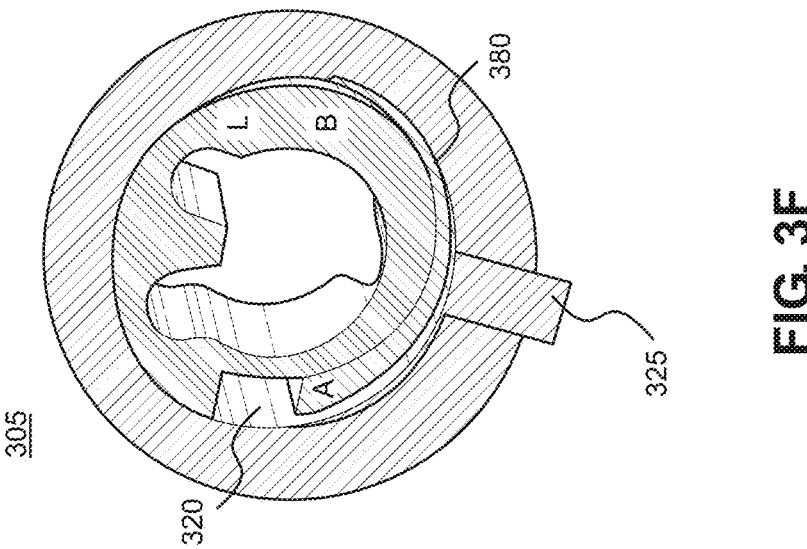
FIG. 3F is a cross-sectional view about reference plane A-A of the annularly varying damping adjuster in a modified damping position located at a point in the gradually reducing variable flow area feature, in accordance with an embodiment.
Figure 3E:
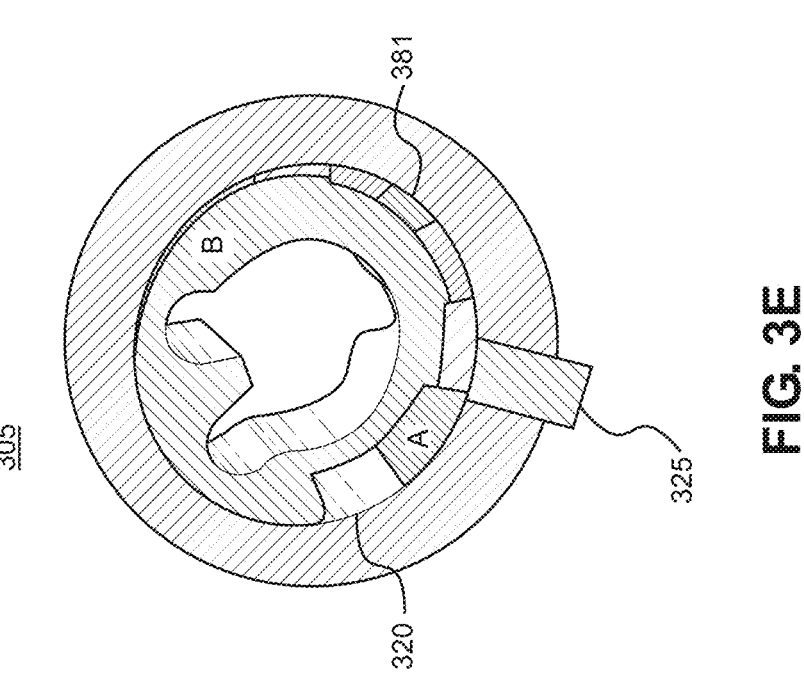
FIG. 3E is a cross-sectional view about reference plane A-A of the annularly varying damping adjuster in a modified damping position located at one of the number of graduated steps of the variable flow area feature, in accordance with an embodiment.

Referring now to FIG. 3E, a cut-away view of adjuster shaft 305 about reference plane A-A of the damping adjuster 220 in a modified damping position with respect to port 325 is shown in accordance with an embodiment. That is, port 325 is aligned with one of the number of graduated steps in the stepped variable flow area feature 381 that is neither the minimum flow restriction A nor the maximum flow restriction B. In other words, FIG. 3E is an example of the adjuster shaft 305 being adjusted to a position somewhere between minimum flow restriction A and maximum flow restriction B on a step-graduated embodiment of stepped variable flow area feature 381.

With reference now to FIG. 3F, a cut-away view of adjuster shaft 305 about reference plane A-A of the damping adjuster 220 in a modified damping position with respect to port 325 is shown in accordance with an embodiment. That is, port 325 is aligned with a portion of the gradually reducing variable flow area feature 380 that is neither the minimum flow restriction A nor the maximum flow restriction B. In other words, FIG. 3F is an example of the adjuster shaft 305 being adjusted to a position somewhere between minimum flow restriction A and maximum flow restriction B along a gradually reducing width of variable flow area feature 380.

Figure 4B:
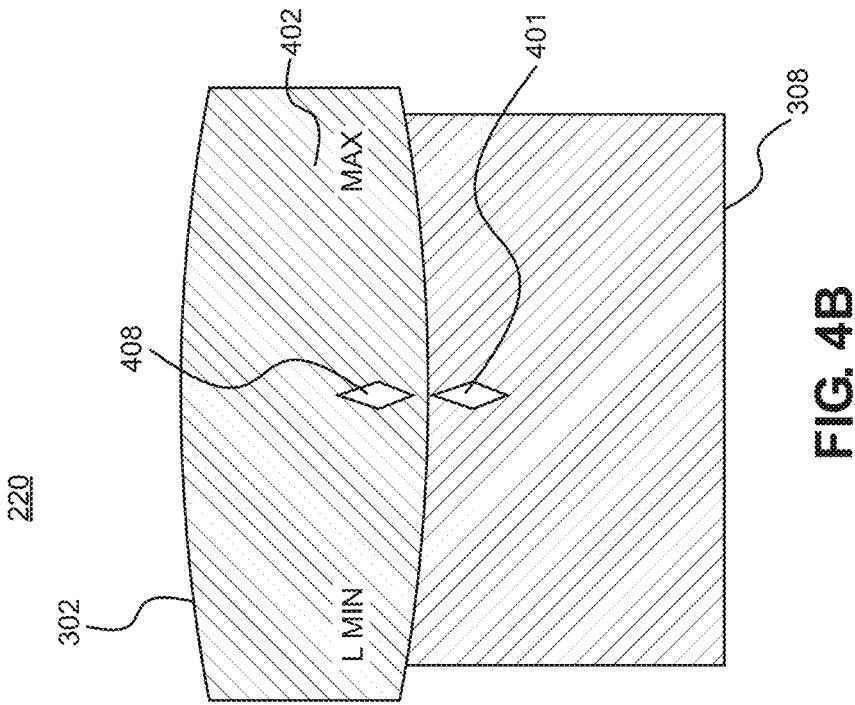
FIG. 4B is a front perspective view of the adjustment input area of annularly varying damping adjuster with markings on the knob and body, in accordance with an embodiment.
Figure 4A:
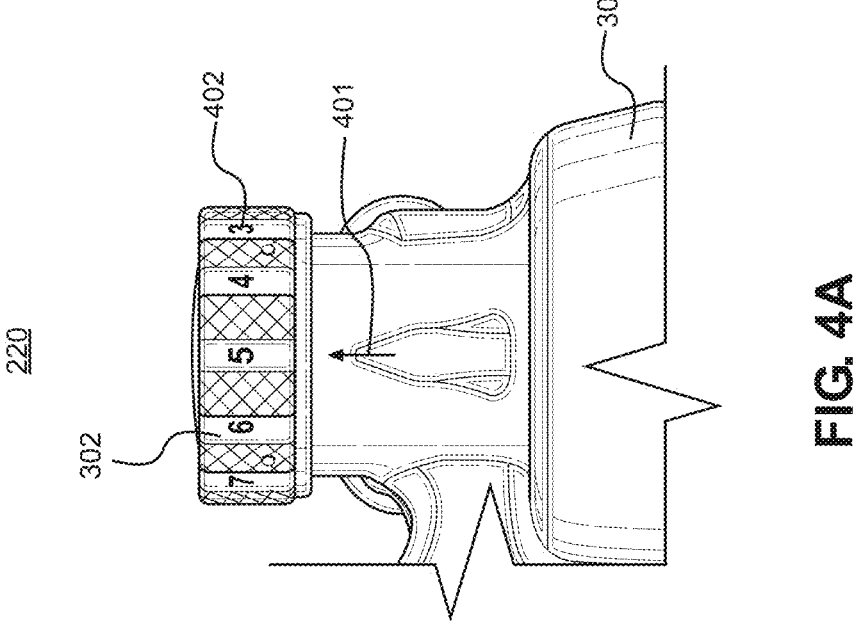
FIG. 4A is a front perspective view of the adjustment input area of annularly varying damping adjuster including an adjustment knob with markings thereon, in accordance with an embodiment.

Regarding FIG. 4A, a perspective view of the adjustment input area of damping adjuster 220 with markings on the adjuster knob 302 and/or adjuster housing 308 is shown in accordance with an embodiment. In one embodiment, the adjustment input area of damping adjuster 220 includes a number of setting identifiers 402 (such as numbers, roman numerals, geometric shapes, braille, etc.) and an indicator 401 (e.g., an arrow, line, squiggle, geometric shape, word, or the like). In one embodiment, one or both of setting identifiers 402 and indicator 401 are markings provided by the manufacturer during the manufacturing process. In one embodiment, one or both of setting identifiers 402 and indicator 401 are markings added after the manufacturing process.

In one embodiment, there are a number of setting identifiers 402 on adjuster knob 302 and an indicator 401 on adjuster housing 308 is used to visually indicate which setting of setting identifiers 402 is presently set. For example, in FIG. 4A, the number 5 from the setting identifiers 402 is aligned with indicator 401 to visually indicate damping adjuster 220 is in position 5. In one embodiment, the setting identifiers 402 and indicator 401 can be reversed. For example, the indicator 401 is on adjuster knob 302 and the setting identifiers 402 are on adjuster housing 308. In one embodiment, the setting identifiers 402 are numbers and could be correlated to the number of steps on variable flow area feature 380 (as shown in FIGS. 3C and 3E).

Referring now to FIG. 4B, a perspective view of the adjustment input area of damping adjuster 220 with markings on the adjuster knob 302 and/or adjuster housing 308 is shown in accordance with an embodiment. For example, in the adjustment input area of damping adjuster 220, indicator 401 is on adjuster housing 308 and a minimum, maximum, and lockout (L) setting identifiers 402 are on adjuster knob 302. In one embodiment, there is also a user made marking 408 on adjuster knob 302 that identifies a user determined damping setting. In one embodiment, there may be more than one user made marks, or a sticker, or the like.

In one embodiment, the setting identifiers 402 could be located on adjuster housing 308 and indicator 401 located on adjuster knob 302. In one embodiment, there is a lack of setting identifiers 402 between the min and max markings. In one embodiment, there may be one or more setting identifiers 402 between the min and max markings.

Figure 5A:
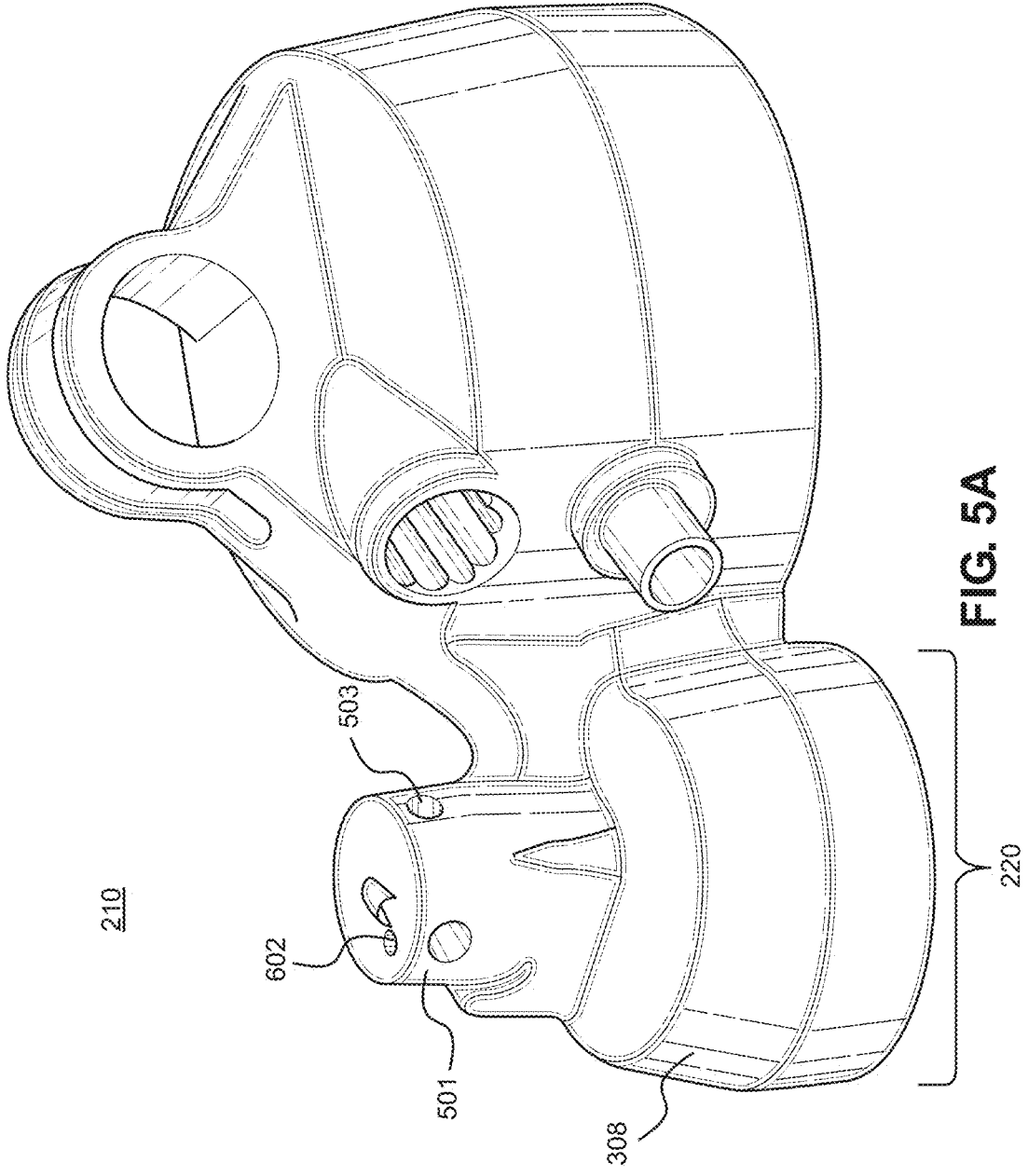
FIG. 5A is a perspective view of the end cap with the annularly varying damping adjuster including the adjustment input area, in accordance with an embodiment.

With reference now to FIG. 5A, a perspective view of end cap 210 with damping adjuster 220 portion of the damper of FIG. 1B is shown in accordance with an embodiment. For purposes of clarity, the interior of damping adjuster 220 is similar to the discussion provided herein and is not repeated for purposes of clarity.

However, in one embodiment, damping adjuster 220 of FIG. 5A, includes a number of cross holes 503 in an adjustment input area 501. In one embodiment, the cross holes 503 are used by the cup, ball, spring, and adjuster knob 302 features shown in FIGS. 5C-5E and discussed in the related description thereof.

In one embodiment, damping adjuster 220 of FIG. 5A, includes a hard stop pocket or hard stop detent 602 in the adjustment input area 501. In one embodiment, hard stop detent 602 is used in conjunction with adjuster knob 302 and specifically with the features shown in FIGS. 6A and 6B and discussed in the related description thereof.

Figure 5B:
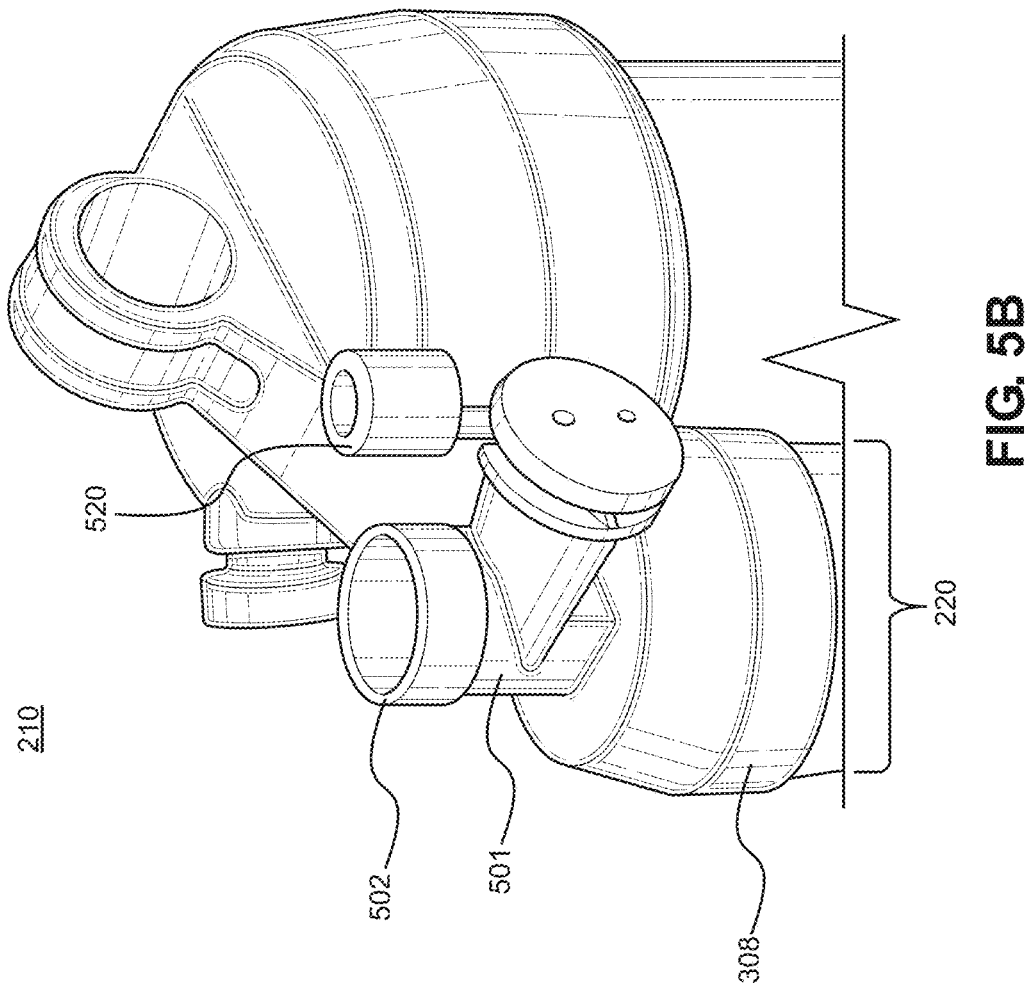
FIG. 5B is a perspective view of the end cap with the annularly varying damping adjuster having a cap thereon instead of an adjuster knob, in accordance with an embodiment.

With reference now to FIG. 5B, a perspective view of end cap 210 with damping adjuster 220 portion of the damper of FIG. 1B with a cap thereon instead of an adjuster knob is shown in accordance with an embodiment. For purposes of clarity, the interior of damping adjuster 220 is similar to the discussion provided herein and is not repeated for purposes of clarity.

However, in one embodiment, damping adjuster 220 of FIG. 5B, includes a cover 502 (or cap, or the like, or in one embodiment no features at all) in the adjustment input area 501. Since there is a cover 502 (or no features at all) there is not an adjuster knob 302 for inputting any manual adjustments to the damping adjuster 220. In one embodiment, this configuration is used when the damping adjuster 220 is actively or semiactively controlled such that electrical signals are used to rotate adjuster shaft 305 and modify the damping settings. In one embodiment, this configuration is used when the damping adjuster 220 is controlled by a hydraulic line or cable such that remote components are used to rotate adjuster shaft 305 and modify the damping settings.

In one embodiment, damping adjuster 220 of FIG. 5B optionally includes a firm switch 520 to switch the damping adjuster 220 to its firmest (e.g., lockout mode) setting. In one embodiment, firm switch 520 is actively or semiactively controlled such that electrical signals are used to activate or deactivate the lockout mode. In one embodiment, firm switch 520 is controlled by a hydraulic line or cable such that remote components are used to activate or deactivate the lockout mode.

Figure 5C:
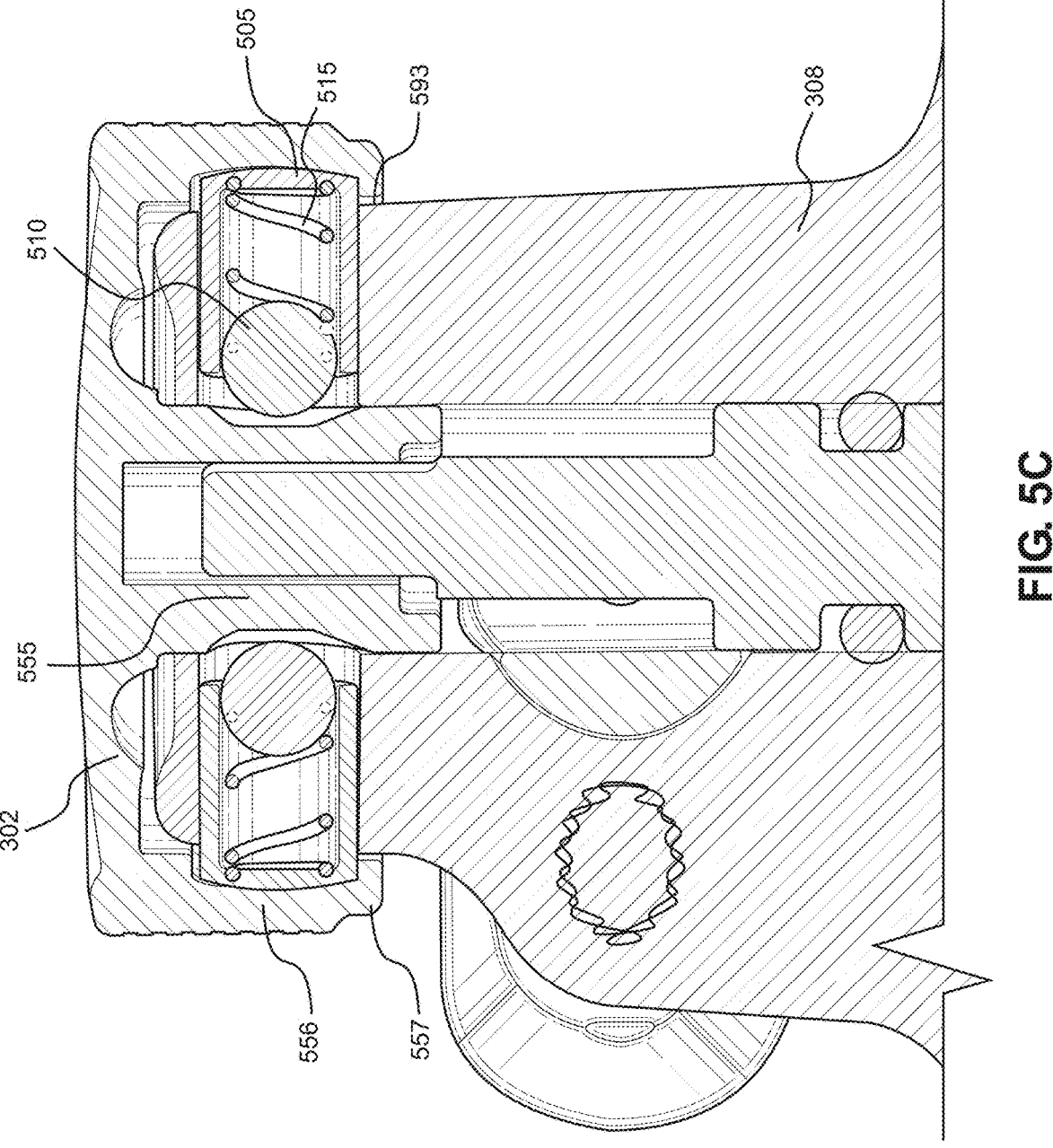
FIG. 5C is a side-sectional view of the adjustment input area of the annularly varying damping adjuster with an adjuster knob retaining component, in accordance with an embodiment.

Referring now to FIG. 5C, a side-sectional view of the adjustment input area of damping adjuster 220 with an adjuster knob retaining component is shown in accordance with an embodiment. In one embodiment, the adjustment input area of damping adjuster 220 of Figure includes adjuster knob 302, adjuster housing 308, cups 505, balls 510, and springs 515. In one embodiment, spring pressure from springs 515 is applied to the related ball 510 within their related cups 505, causing balls 510 to be forced against an interior wall 555 of adjuster knob 302.

At the same time, the spring pressure from springs 515 is also acting in the opposite direction, e.g., against the back end (or bottom) of their related cups 505. In so doing, the exterior side of the back end of cups 505 are forced against the inner side of the outer wall 556 of adjuster knob 302. In one embodiment, the bottom portion of the outer wall 556 of adjuster knob 302 includes a tab 557 (or lip about the circumference of adjuster knob 302) which acts to hold the adjuster knob 302 securely under the cups 505.

In so doing, the adjuster knob 302 interfaces with adjuster shaft 305 (as shown in Figure and is retained in its proper location with respect to adjustment input area 501 of adjuster housing 308 by the cups 505, balls 510, and springs 515 without requiring any additional attachment features for retaining the adjuster knob 302. In one embodiment, the interface between the adjuster knob 302 and the adjuster shaft 305 is a clearance interface such that the adjuster shaft 305 can move vertically within the adjuster housing 308 without the adjuster knob 302 moving vertically. In one embodiment, once the adjuster knob 302 is retained by the cups 505, balls 510, and springs 515, it will not move vertically regardless of the vertical motion of adjuster shaft 305.

Although in one embodiment, two cups 505, balls 510, and springs 515 are shown; In another embodiment, there may only be a single cup, ball, and spring or there may be three or more cups 505, balls 510, and springs 515.

Figure 5D:
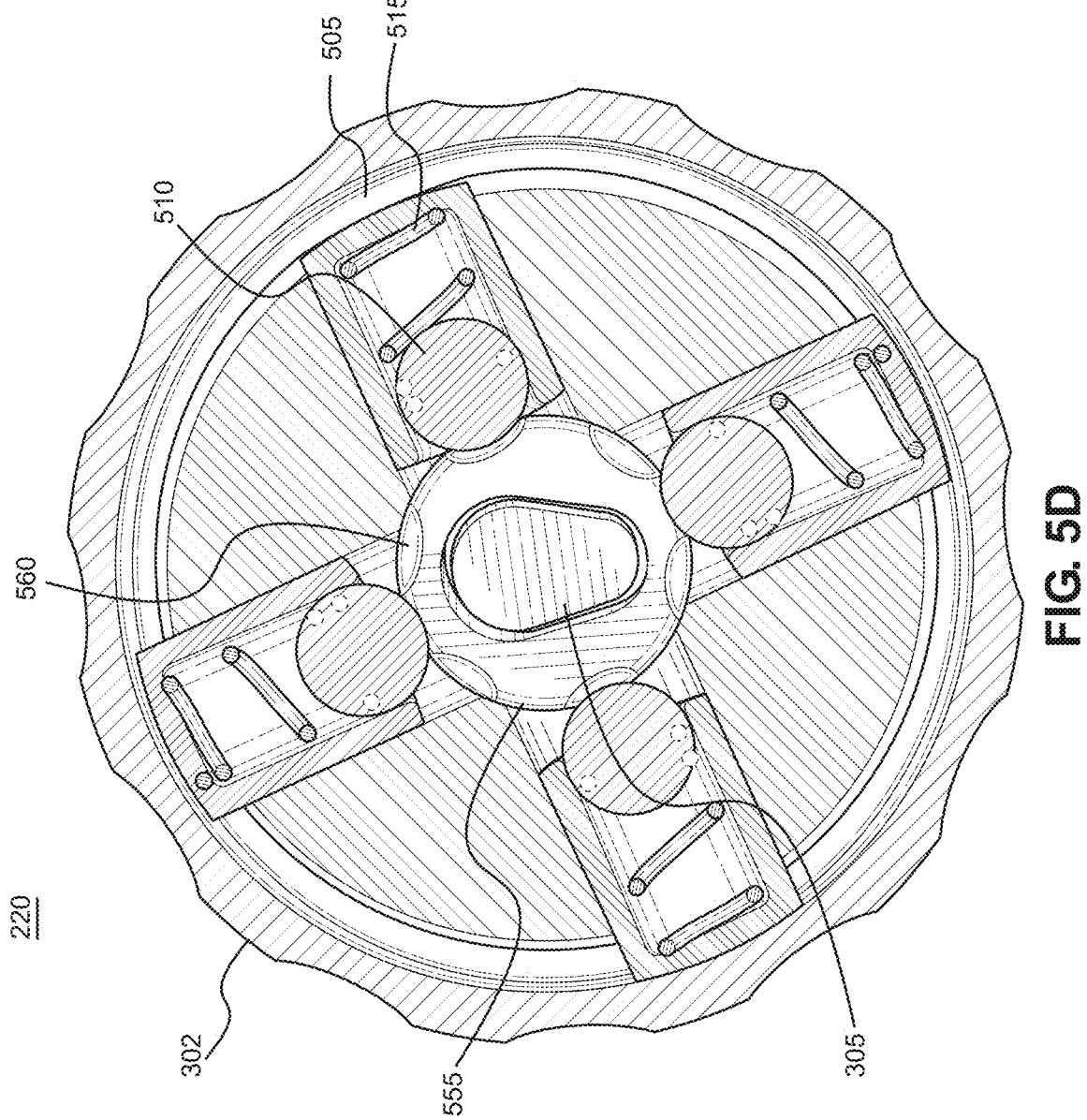
FIG. 5D is a top-section view of the adjustment input area of the annularly varying damping adjuster, in accordance with an embodiment.

With reference now to FIG. 5D, a top-section view of the adjustment input area of damping adjuster 220 is shown in accordance with an embodiment. In one embodiment, the adjustment input area of damping adjuster 220 of FIG. 5C includes adjuster knob 302, adjuster shaft 305, interior wall 555 of adjuster knob 302, features 560 on the interior wall of adjuster knob 302, cups 505, balls 510, and springs 515. Although in one embodiment, four cups 505, balls 510, and springs 515 are shown; In another embodiment, there may only be a single cup, ball, and spring or there may be two or more cups 505, balls 510, and springs 515.

In one embodiment, the inner diameter (ID) of interior wall 555 of adjuster knob 302 is configured to approximate the shape of the top portion of adjuster shaft 305, such that when adjuster knob 302 is installed, the top of adjuster shaft 305 is within the ID of interior wall 555. In one embodiment, the interface between the interior wall 555 of adjuster knob 302 and the adjuster shaft 305 is a clearance interface such that the adjuster shaft 305 can move vertically within the adjuster housing 308 without the adjuster knob 302 moving vertically. In one embodiment, once the adjuster knob 302 is retained by the cups 505, balls 510, and springs 515, it will not move vertically regardless of the vertical motion of adjuster shaft 305. In one embodiment, the rotation of adjuster knob 302 will cause the rotation of adjuster shaft 305. In one embodiment, the clearance interface refers to an interface with some amount of space between the ID of interior wall 555 and adjuster shaft 305 such that the adjuster shaft 305 can move vertically within adjuster housing 308 as described herein.

As adjuster knob 302 is rotated, the ID of interior wall 555 will impart a rotational force on adjuster shaft 305 causing adjuster shaft to rotate in the same direction. This rotation of adjuster shaft 305 will cause the variable flow area feature 380 to change based on the direction adjuster knob 302 is rotated thereby modifying the damping characteristics of damper assembly 38.

In one embodiment, the outer diameter (OD) of interior wall 555 of adjuster knob 302 includes a number of features 560 such as indents, depressions, raises, bumps, or the like which provide a natural set of stop locations for balls 510. Thus, as adjuster knob 302 is rotated, balls 510 will move from one set of features 560 to the next. In one embodiment, the motion of balls 510 will provide feedback to the user rotating the adjuster knob 302 to help identify how many "clicks" adjuster knob 302 has been turned. In one embodiment, the natural set of stop locations will be aligned with the setting identifiers 402 and indicator 401 as shown at least in FIGS. 4A-4B.

Figure 5E:
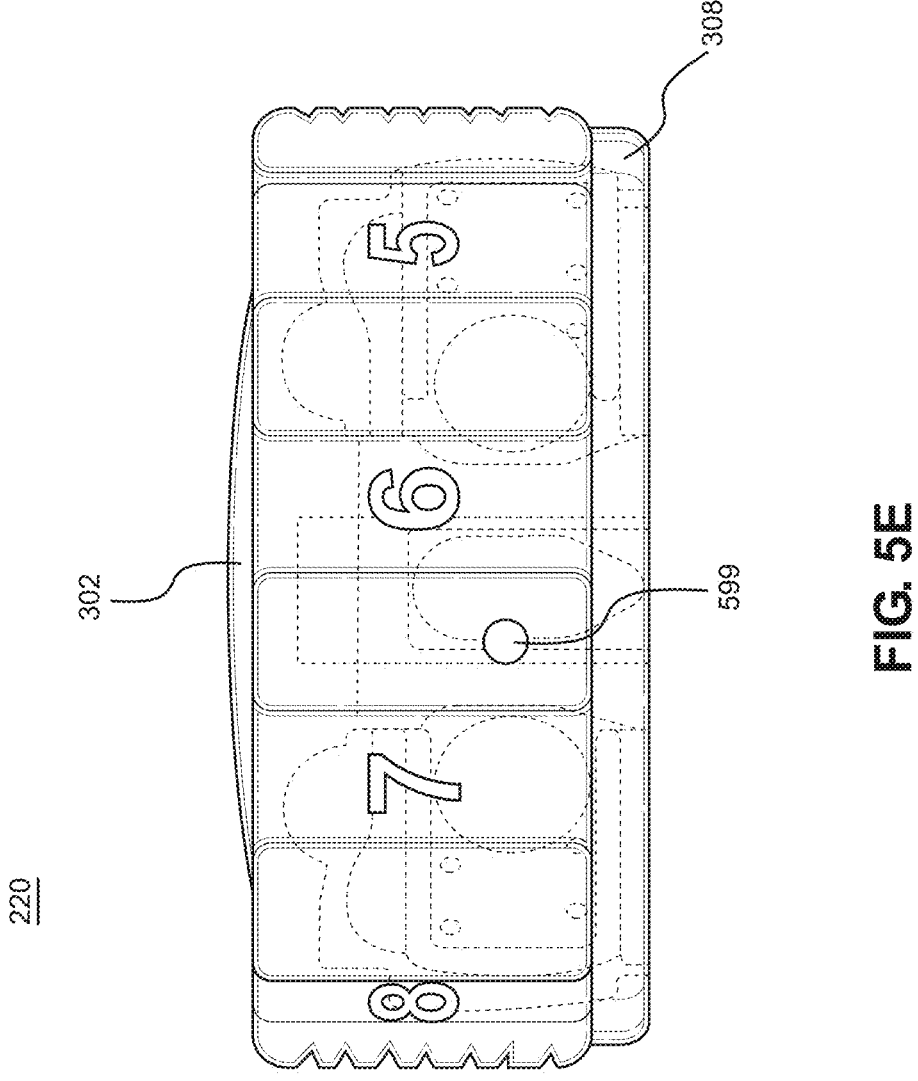
FIG. 5E is a side perspective view of the adjustment input area of annularly varying damping adjuster including the adjuster knob and an access hole, in accordance with an embodiment.

Referring now to FIG. 5E, a perspective view of the adjustment input area of damping adjuster 220 including adjuster knob 302 is shown in accordance with an embodiment. In Figure a hole 599 is shown. In conjunction with FIGS. 5C and 5D, in one embodiment, there is a hole 599 in adjuster knob 302 for each of the cups 505. Moreover, when adjuster knob 302 is properly aligned, there will be a hole 599 aligned with each of the cups 505. Thus, to remove the adjuster knob 302 from the adjuster housing 308, a tool (e.g., pin, needle, paperclip, Alen tool, or the like) is inserted into each hole 599 to depress each of the cups 505 inward until they are inside the diameter of lip or tab 557 of adjuster knob 302. Once the cups 505 are so depressed, the adjuster knob 302 can be moved upward and taken off of adjuster housing 308.

In one embodiment, cups 505 may include a feature such as a lip, detent, or the like, that acts in concert with a feature in adjuster housing 308 to stop one or more of cups 505 (and possibly springs 515 and balls 510) from ejecting from adjuster housing 308 as the adjuster knob 302 is removed.

Figure 6A:
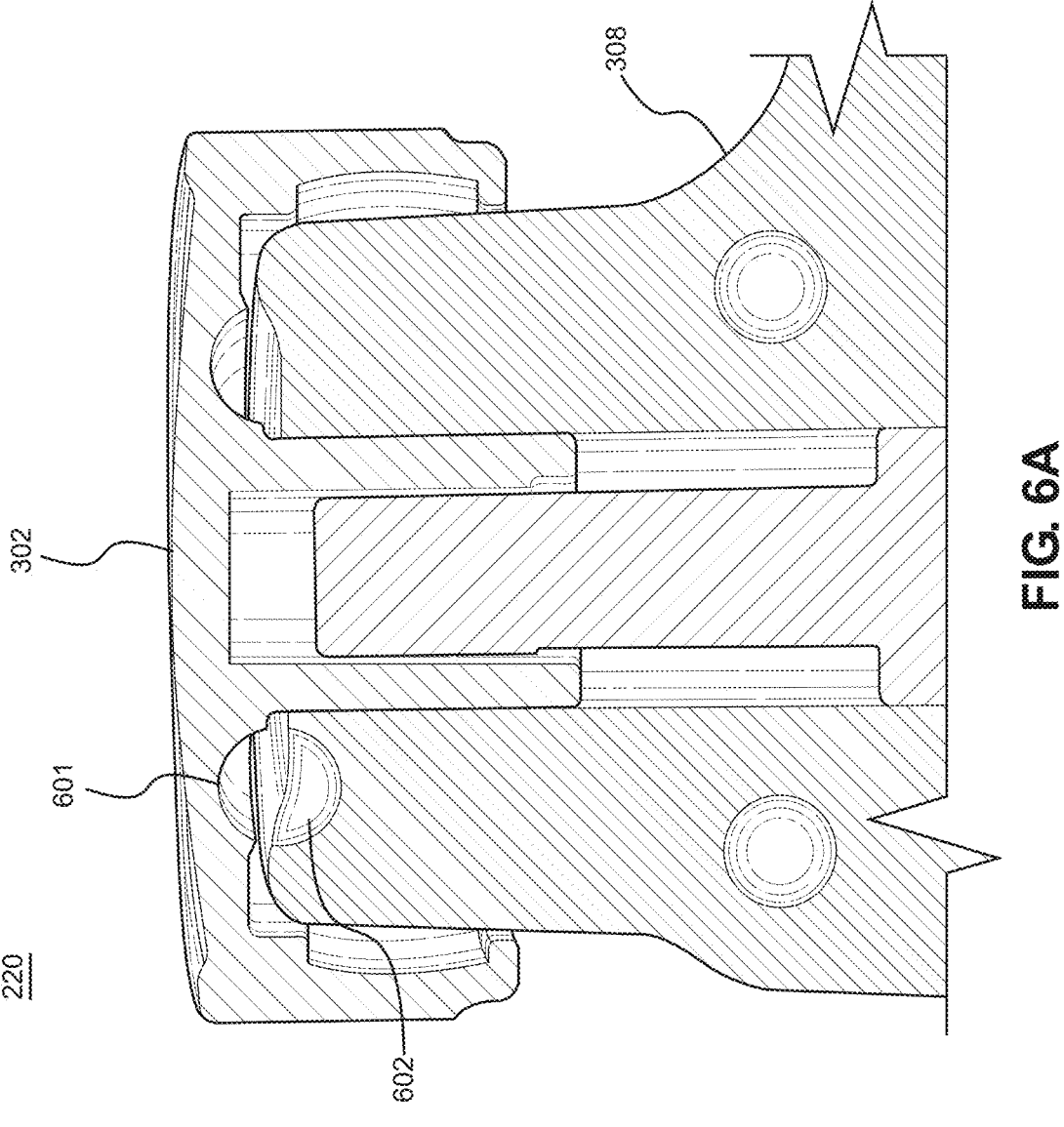
FIG. 6A is a side-section view of the adjustment input area of annularly varying damping adjuster including the adjuster knob with a groove formed circumferentially therein, in accordance with an embodiment.

With reference now to FIG. 6A, a side-section view of the adjustment input area of damping adjuster 220 including adjuster knob 302 with a groove 601 formed annularly about a portion of an underside thereof, is shown in accordance with an embodiment. In one embodiment, adjuster housing 308 also includes a hard stop detent 602. In one embodiment, a bearing, ball, or the like is used in hard stop detent 602. In one embodiment, hard stop detent 602 is an extruded, machined, glued, welded, or otherwise extended appendage of adjuster housing 308 that fits within groove 601 without requiring any type of bearing, ball, or the like.

Figure 6B:
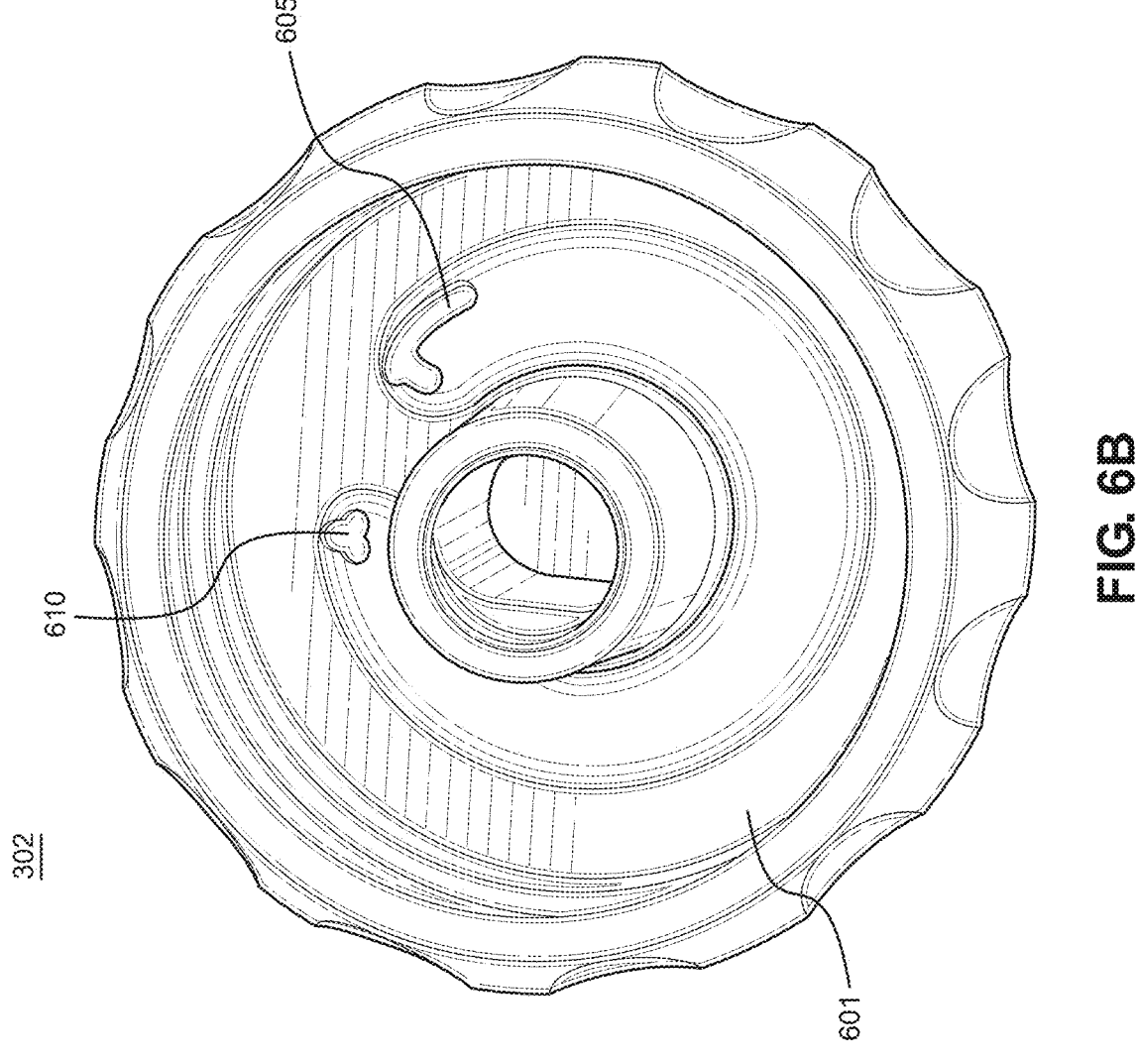
FIG. 6B is a perspective view of the bottom of the adjuster knob with the groove formed circumferentially therein, in accordance with an embodiment.

Referring now to FIG. 6B, a perspective view of the bottom of adjuster knob 302 is shown in accordance with an embodiment. In one embodiment, adjuster knob 302 includes circumferentially groove 601 about an interior of the top wall. Moreover, both ends (e.g., first end 605 and second end 610) of groove 601 are also shown. In one embodiment, during installation of adjuster knob 302, groove 601 of adjuster knob 302 is oriented with respect to hard stop detent 602 such that when adjuster knob 302 is installed with adjuster housing 308 the bearing in hard stop detent 602 (or just the hard stop detent 602 feature) will be within the pathway of groove 601.

In one embodiment, the groove 601 and hard stop detent 602 are aligned during installation of adjuster knob 302 (and respectively the underlying adjuster shaft 305) such that the first end 605 of groove 601 will encounter hard stop detent 602 at a maximum or a minimum rotational position of adjuster shaft 305, and such that the second end 610 of groove 601 will encounter hard stop detent 602 at the other of the maximum or minimum rotational position of adjuster shaft 305.

As discussed herein, the damping adjuster 220 can use a single range of rotation that is less than 360 degrees for adjuster shaft 305 (and thus adjuster knob 302) to control both damping characteristics and lockout. That is, in one embodiment, there is a full range of adjustment from maximum to minimum flow rate with less than a full rotation of adjuster knob 302 (and thus adjuster shaft 305). This range of motion of less than 360 degrees is, in one embodiment, controlled by groove 601 that has a first end 605 and a second end 610. As such, the adjuster knob 302 is only able to rotate less than 360 degrees in either direction.

In one embodiment, by making the range of rotation of adjuster knob 302, and thus adjuster shaft 305, less than 360 degrees, a manufacturer (or distributer, seller, mechanic, user, or the like) can provide one or more setting identifiers 402 and/or indicator 401 on the adjuster housing 308 and/or adjuster knob 302 that will provide accurate visual identification of the present setting for any damping setting. Therefore, unlike most other rotational knobs, there is no need to wind the adjuster knob 302 all the way down (or up) and then count the number of rotations to determine and/or adjust the damping setting.

In one embodiment, the one or more setting identifiers 402 and/or indicator 401 could be marks (or numbers, shapes, braille, 3-D features, etc.) that are provided on adjuster knob 302 and/or adjuster housing 308. In one embodiment, the one or more setting identifiers 402 and/or indicator 401 could be machine made, stickers, pen marks, scratches, pencil marks, or the like.

As discussed herein, the one or more setting identifiers 402 and/or indicator 401 would be used to indicate different damping settings. For example, by looking at adjuster knob 302 and the alignment of the setting identifiers 402 and/or indicator 401 thereon in conjunction with the other of the setting identifiers 402 and/or indicator 401 on adjuster housing 308, the user would be able to quickly determine the existing damping setting.

Therefore, unlike a threaded damping adjuster that rotates through a number of revolutions when inserting or removing the needle (or rod) into the orifice, in one embodiment, the present invention provides the ability to know the current damping setting and adjust it based on setting identifiers 402 alignment with indicator 401 (or the like), because the range of adjustment is less than the full rotation of adjuster knob 302 (and thus adjuster shaft 305).

In one embodiment, one, some, or all of the components of the damping adjuster 220 are machined, cast, 3D printed, or the like. Thus, in operation, the damping adjuster 220 allows a change in damping orifice size during rotation of adjuster shaft 305 without the complications of a threaded needle, cam and cam follower, or the like. For example, it allows for the adjuster shaft 305 to rotate for a damping adjustment while also translating freely within the adjuster housing 308 for another adjustment (such as lockout). In one embodiment, damping adjuster 220 reduces part count while also providing an adjustment range of less than 360 degrees, making it easier for the user to discern the current, max, and min damping positions. Moreover, one embodiment allows the adjuster shaft 305 to provide both damping adjustment and lockout in a single part instead of a collection of parts.

Although the damping adjustment is used in the discussion as a compression adjustment in one embodiment, this was done for purposes of brevity and clarity. It will be understood that one embodiment of the present invention may be used in other adjustment categories including, but not limited to, a low speed damping adjustment, a high speed damping adjustment, a rebound adjustment, a low speed rebound adjustment, a high speed rebound adjustment, etc.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A damping adjuster disposed within a damping housing of a vehicle suspension system, said damping adjuster comprising:

an adjuster housing configured to be coupled with a shaft of said vehicle suspension system;

an adjuster shaft, said adjuster shaft rotatable within said adjuster housing, said adjuster shaft comprising a variable flow area feature, said variable flow area feature formed annularly about a portion of said adjuster shaft, said variable flow area feature comprising a plurality of different flow area values therealong, wherein said adjuster shaft is vertically moveable within said adjuster housing, wherein said adjuster shaft is configured in a first vertical location within said adjuster housing to provide a normal fluid flow configuration, and wherein said adjuster shaft is configured in a second vertical location, different than said first vertical location, within said adjuster housing to provide a lockout fluid flow configuration;

a fluid flow path through said adjuster housing, wherein said fluid flow path includes said variable flow area feature of said adjuster shaft of said damping adjuster of said vehicle suspension system, wherein said fluid flow path is configured for rebound fluid flow between an external fluid reservoir and a damper chamber; and a spring at a base of said adjuster shaft.

2. The damping adjuster of claim 1, further comprising: said adjuster shaft configured for a maximum rotation of less than 360 degrees within said adjuster housing.

3. The damping adjuster of claim 2, further comprising: said variable flow area feature formed annularly about said portion of said adjuster shaft such that a maximum rotation of said adjuster shaft in a first direction provides a minimal damper adjustment value.

4. The damping adjuster of claim 3, further comprising: said variable flow area feature formed annularly about said portion of said adjuster shaft such that said maximum rotation of said adjuster shaft in a second direction opposite said first direction provides a maximum damper adjustment value.

5. The damping adjuster of claim 3, further comprising: said variable flow area feature formed annularly about said portion of said adjuster shaft such that less than said maximum rotation of said adjuster shaft in a second direction opposite said first direction provides less than a maximum damper adjustment value.

6. The damping adjuster of claim 1, further comprising: said fluid flow path is configured for compression fluid flow between the damper chamber and the external fluid reservoir.

7. The damping adjuster of claim 1, wherein said damping adjuster is a low speed damping adjuster.

8. The damping adjuster of claim 1, wherein said damping adjuster is a high speed damping adjuster.

9. The damping adjuster of claim 1, further comprising: said variable flow area feature is formed annularly about a perimeter of said portion of said adjuster shaft.

10. A damping adjuster disposed within a damping housing of a vehicle suspension system, said damping adjuster comprising:

an adjuster housing configured to be coupled with a shaft of said vehicle suspension system;

an adjuster shaft, said adjuster shaft rotatable within said adjuster housing, said adjuster shaft configured for a maximum rotation of less than 360 degrees within said adjuster housing, said adjuster shaft comprising a variable flow area feature, said variable flow area feature formed annularly about a portion of said adjuster shaft, said variable flow area feature comprising a plurality of different flow area values therealong;

a fluid flow path through said adjuster housing, wherein said fluid flow path includes said variable flow area feature of said adjuster shaft;

an adjuster knob configured to rotatably couple about said adjuster housing, said adjuster knob comprising:

an adjuster shaft interface on a first side of an interior wall, said adjuster shaft interface to interact with a portion of said adjuster shaft, such that a rotation of said adjuster knob causes a related rotation of said adjuster shaft of said damping adjuster of said vehicle suspension system;

a ball interface on a second side of said interior wall, said ball interface comprising a plurality of features, each feature of said plurality of features is to provide a stop location;

an exterior wall; and a tab disposed about a circumference of a bottom of said exterior wall;

a plurality of cross holes formed in said adjuster housing;

a cup in at least one of said plurality of cross holes formed in said adjuster housing;

a spring in said cup;

a ball, wherein said spring is between a bottom of said cup and said ball, wherein when said adjuster knob is coupled with said adjuster housing, said spring provides a spring force against said ball such that said ball is forced against said ball interface and said spring provides said spring force against an interior side of said bottom of said cup such that an exterior side of said bottom of said cup is forced against an inner side of said exterior wall between a top of said adjuster knob and said tab, such that said adjuster knob is rotatably coupled with said adjuster housing;

a hard stop detent formed in said adjuster housing; and a rotational groove formed annularly about less than a complete revolution of an underside of said adjuster knob, wherein said adjuster knob is installed on said adjuster housing in an orientation such that a first end of said rotational groove will encounter said hard stop detent at a maximum first direction rotational position of said adjuster shaft and a second end of said rotational groove will encounter said hard stop detent at a maximum second direction rotational position of said adjuster shaft.

11. The damping adjuster of claim 10, further comprising: said hard stop detent formed in an underside of said adjuster knob; and said rotational groove formed annularly about less than a complete revolution about said adjuster housing, wherein said adjuster knob is installed on said adjuster housing in an orientation such that the first end of said rotational groove will encounter said hard stop detent at the maximum first direction rotational position of said adjuster shaft and the second end of said rotational groove will encounter said hard stop detent at the maximum second direction rotational position of said adjuster shaft.

12. A damping adjuster disposed within a damping housing of a vehicle suspension system, said damping adjuster comprising:

an adjuster housing configured to be coupled with a shaft of said vehicle suspension system;

an adjuster shaft, said adjuster shaft rotatable within said adjuster housing, said adjuster shaft comprising a variable flow area feature, said variable flow area feature formed annularly about a portion of said adjuster shaft, said variable flow area feature comprising a plurality of different flow area values therealong;

a fluid flow path through said adjuster housing, wherein said fluid flow path includes said variable flow area feature of said adjuster shaft; and an adjuster knob configured to rotatably couple about said adjuster housing, said adjuster knob comprising:

an adjuster shaft interface on a first side of an interior wall, said adjuster shaft interface to interact with a portion of said adjuster shaft, such that a rotational movement of said adjuster knob causes a related rotation of said adjuster shaft of said adjuster knob of said vehicle suspension system;

wherein said variable flow area feature formed annularly about said portion of said adjuster shaft such that a maximum rotation of said adjuster shaft in a first direction provides a minimal damper adjustment value, and a maximum rotation of said adjuster shaft in a second direction opposite said first direction provides a maximum damper adjustment value;

a spring at a base of said adjuster shaft such that said adjuster shaft is vertically moveable within said adjuster housing;

said adjuster shaft configured in a first vertical location within said adjuster housing to provide a normal fluid flow configuration; and said adjuster shaft configured in a second vertical location, different than said first vertical location, within said adjuster housing to provide a lockout fluid flow configuration, wherein said variable flow area feature formed annularly about said portion of said adjuster shaft such that less than said maximum rotation of said adjuster shaft in said second direction opposite said first direction provides less than said maximum damper adjustment value.

13. The damping adjuster of claim 12, wherein said adjuster knob further comprises:

a ball interface on a second side of said interior wall, said ball interface comprising a plurality of features, each feature of said plurality of features to provide a stop location;

an exterior wall; and a tab disposed about a circumference of a bottom of said exterior wall.

14. The damping adjuster of claim 13, further comprising:

a plurality of cross holes formed in said adjuster housing;

a cup in at least one of said plurality of said cross holes formed in said adjuster housing;

a spring in said cup; and a ball, wherein said spring is between a bottom of said cup and said ball, wherein when said adjuster knob is coupled with said adjuster housing, said spring provides a spring force against said ball such that said ball is forced against said ball interface and said spring provides said spring force against an interior side of said bottom of said cup such that an exterior side of said bottom of said cup is forced against an inner side of said exterior wall between a top of said adjuster knob and said tab, such that said adjuster knob is rotatably coupled with said adjuster housing.

* * * * *